(12) United States Patent
Henderson et al.

(10) Patent No.: US 8,680,975 B2
(45) Date of Patent: Mar. 25, 2014

(54) HAPTIC ACTUATOR SYSTEMS AND METHODS THEREOF

(75) Inventors: David A. Henderson, Farmington, NY (US); Qin Xu, West Henrietta, NY (US)

(73) Assignee: New Scale Technologies, Victor, NY (US)

( * ) Notice: Subject to any disclaimer, the term of this patent is extended or adjusted under 35 U.S.C. 154(b) by 927 days.

(21) Appl. No.: 12/751,662

(22) Filed: Mar. 31, 2010

(65) Prior Publication Data
US 2011/0241851 A1 Oct. 6, 2011

(51) Int. Cl.
*G09B 21/00* (2006.01)

(52) U.S. Cl.
USPC ............... 340/407.1; 340/407.2; 318/136; 318/159; 318/160

(58) Field of Classification Search
USPC ............... 340/407; 318/136, 159, 160
See application file for complete search history.

(56) References Cited

U.S. PATENT DOCUMENTS

| | | | |
|---|---|---|---|
| 2,439,499 | A | 4/1948 | Williams et al. |
| 5,365,139 | A * | 11/1994 | Kasuga et al. ........... 310/316.02 |
| 6,940,209 | B2 | 9/2005 | Henderson |
| 7,309,943 | B2 * | 12/2007 | Henderson et al. ...... 310/323.02 |
| 7,312,559 | B2 | 12/2007 | Lee et al. |
| 2007/0138915 | A1 | 6/2007 | Mulvihill et al. |
| 2008/0084384 | A1 | 4/2008 | Gregorio et al. |
| 2008/0252594 | A1 | 10/2008 | Gregorio et al. |
| 2009/0026891 | A1 | 1/2009 | Koc |
| 2009/0295552 | A1 | 12/2009 | Shahoian et al. |
| 2010/0039715 | A1 | 2/2010 | Xu et al. |
| 2010/0045140 | A1 | 2/2010 | Kang et al. |

FOREIGN PATENT DOCUMENTS

KR 10200907812 A 7/2009

OTHER PUBLICATIONS

Koc, Burhanettin. A Piezoelectric Motor Using Two Orthogonal Bending Modes of a Hollow Cylinder. IEEE Transactions on Ultrasonics, Ferroelectrics, and Frequency Control, vol. 49, No. 4, Apr. 2002. pp. 495-500.*
Introduction to Tribology—Friction, all pages pertinent, accessed Jul. 1, 2013, published on or before Sep. 8, 2003.*
International Search Report for International Patent Application No. PCT/US2011/030200 (Mar. 28, 2011).
Morita et al., "An Ultrasonic Micro Motor Using a Bending Transducer Based on PZT Thin Film", Sensors and Actuators A, 50:75-80 (1995).
Koc et al., "A Piezoelectric Motor Using Two Orthogonal Bending Modes of a Hollow Cylinder", IEEE Transactions on Ultrasonic Ferroelectrics, and Frequency Control, 49:495-500 (Apr. 2002).

* cited by examiner

*Primary Examiner* — Daniel Wu
*Assistant Examiner* — John Bamert
(74) *Attorney, Agent, or Firm* — LeClairRyan, a Professional Corporation

(57) ABSTRACT

A haptic actuator system and a method of making the same include an ultrasonically vibrating motor body. A shaft is coupled to the vibrating motor body, the shaft arranged to rotate in at least one direction in response to the vibrating motor body. At least one unbalanced mass is coupled to and is moveable with the shaft to generate human-detectable vibrations in response to a motion of the shaft.

46 Claims, 31 Drawing Sheets

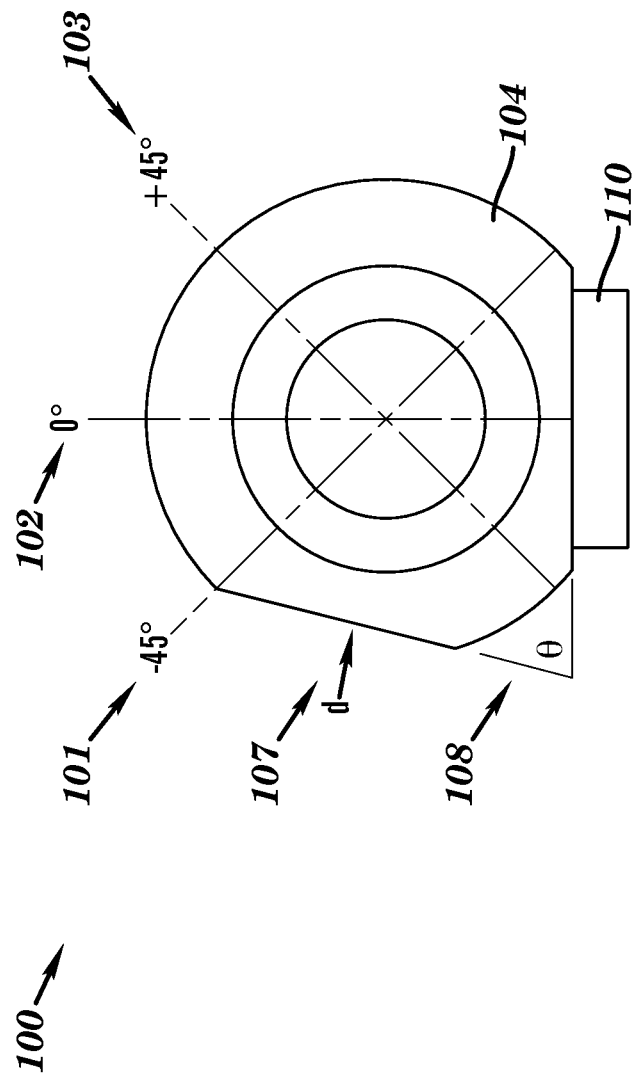

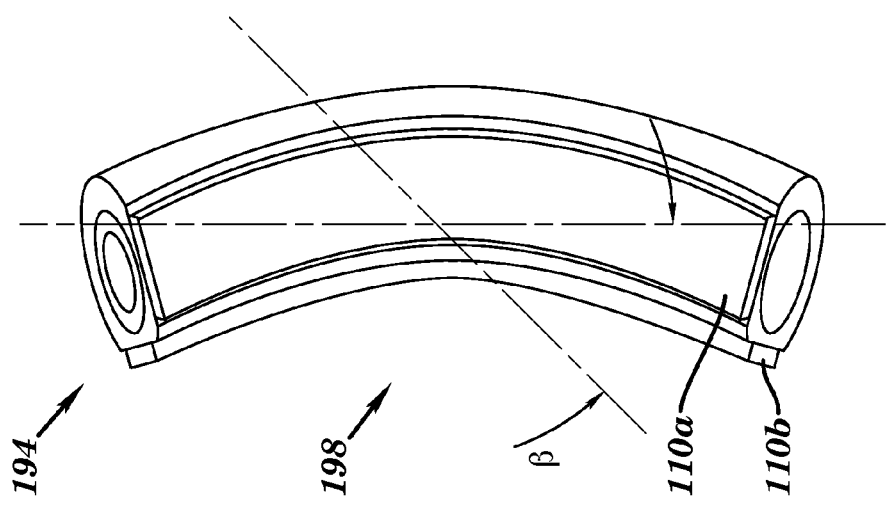
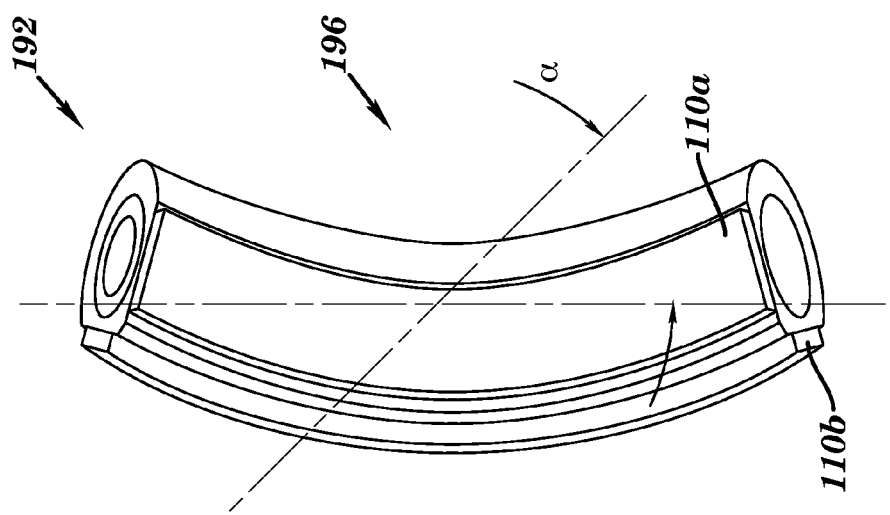

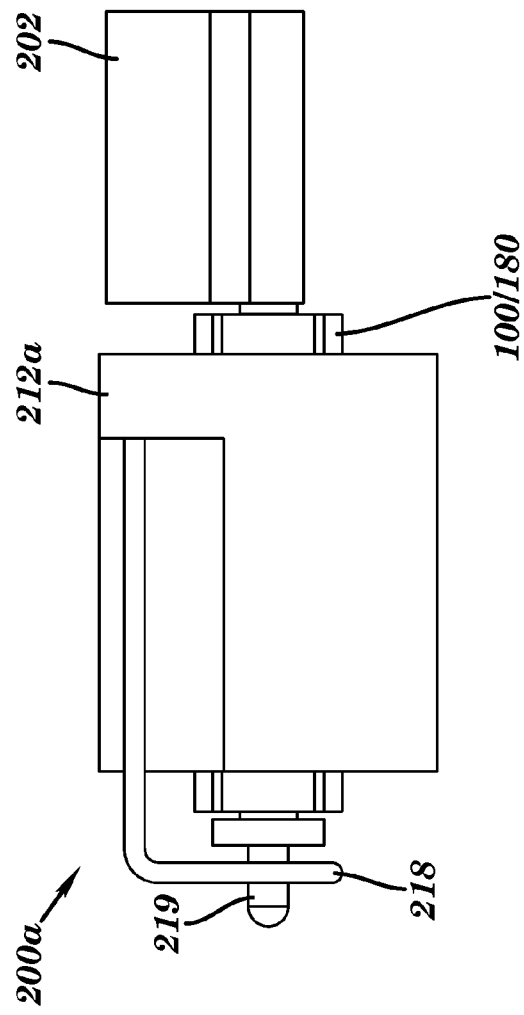
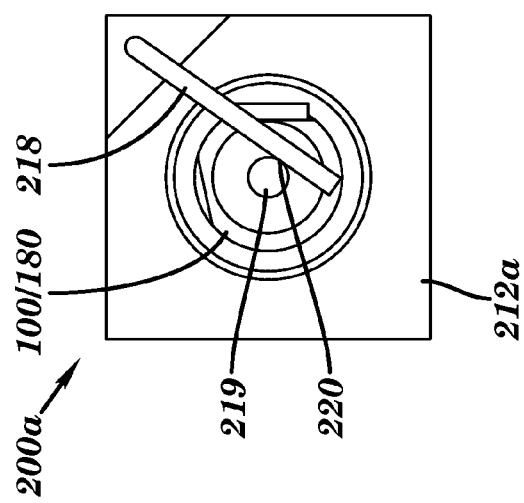
FIG. 13B
FIG. 13A

HAPTIC ACTUATOR SYSTEMS AND METHODS THEREOF

FIELD

The exemplary embodiments of the present invention generally relate to haptic actuator systems and more specifically to a piezoelectric ultrasonic motor including a rotating shaft with an unbalance mass that generates oscillating centripetal force perpendicular to the axis of rotation and methods thereof.

BACKGROUND

Mobile phones and other electronic devices, for example, game controllers, require a vibration source to signal events without creating audible sound, but that are perceived only through the sense of touch. For example, these events might include an incoming phone call, incoming text message, or turbulence of a virtual aeroplane in a computer video game. The vibrations generated by the vibration source must be sufficiently strong to be felt by a person holding the device. These vibration sources are most generally referred to as vibration motors or haptic actuators. One common type of vibration motor is an electromagnetic motor with a rotating shaft and an unbalanced mass attached to the shaft that generates oscillating centripetal force perpendicular to the axis of rotation. Currently, more than one billion vibration motors are manufactured each year and the typical rotation speed is 100 to 300 Hz and the typical centripetal force is 0.1 to 1 N.

Exemplary electromagnetic rotary vibration motors are produced by many companies including Minebea Motor Manufacturing Company of Tokyo, Japan, Sanyo Seitmitsu Co. Ltd. of Nagano, Japan, and KTOL-Jinlong Machinery & Electronics Co. Ltd. of Zhejiang, China. Some versions are tubular type vibration motors and some are disk type vibration motors. For example some of the smallest tubular motors are about 4 mm in diameter and 6 mm in length with a shaft extending from one end of the motor about 4 mm with an unbalanced tungsten mass mounted on the extended shaft. The smallest disk type motors are 10 mm in diameter and 2 mm thick with the tungsten mass rotating inside the motor housing. For both types of motors, a torque is generated to rotate the shaft using conventional direct current (DC) motor designs that include copper coils, iron cores, permanent magnets and coil switching using brushes and armature. Tungsten is used for the mass because its density is more than twice the density of steel. For a tubular motor, a typical Tungsten mass is 0.4 grams with a center of gravity offset 1 mm from the centerline of shaft rotation creating an unbalance mass. For this example when the mass rotates, for example, at 200 Hz (1,256 Rad/sec) the generated centripetal force $F_c$=(Mass)×(angular velocity)$^2$×(Radius of Offset), which equals: 0.0004 Kg×(1256 Rad/sec)$^2$×0.001 M, or $F_c$=0.63 N. This dynamic force is sufficient to accelerate the entire mobile phone handset and create vibrations that are perceived by the user.

Unfortunately, a limitation of existing electromagnetic motors, for example, DC vibration motors, is they produce interfering magnetic fields and are constructed of ferromagnetic and conductive materials. The magnetic interference produced by these motors interferes with the operation of other devices in mobile phones, for example, a compass. This problem is growing as mobile phones add additional devices and also continue to become smaller rated. DC motors also are made from conductive materials that are not transparent to radio frequencies (RF) and can not be located near a radio antenna of a wireless communications device.

Ceramic motors, e.g., piezoelectric ultrasonic motors do not generate magnetic fields, are not made from ferromagnetic materials and can be made substantially from non-conductive materials that are substantially RF transparent. A non-magnetic and RF transparent piezoelectric motor has many exemplary advantages for integration in highly miniaturized mobile phones. These piezoelectric motors that generate rotation and also can be used to generate vibration.

Conventional standing wave tubular ultrasonic motors that produce bi-directional rotation or translation use multiple piezoelectric ceramic elements that are either a single ceramic component that is partitioned electrically into multiple independent segments or separate ceramic components. The piezoelectric elements are electrically driven by independent circuits and produce bidirectional motion using a two-phase drive signal with an adjustable phase or by switching a single phase from one piezoelectric element to another. These piezoelectric motors need one or more contact points between the vibrating tube and the rotating shaft that uses axial preload (parallel to the shaft centerline) to generate the contact friction needed to generate torque on the shaft. Unfortunately, these piezoelectric motors using axial preload to generate friction torque generally produce lower output speed and efficiency.

SUMMARY

A haptic actuator system includes an ultrasonically vibrating motor body, a shaft coupled to the vibrating motor body, the shaft arranged to rotate in at least one direction in response to the vibrating motor body, and at least one unbalanced mass coupled to and moveable with the shaft to generate human-detectable vibrations in response to a motion of the shaft.

A method of making a haptic actuator system includes providing an ultrasonically vibrating motor body, coupling a shaft to the vibrating motor body, the shaft arranged to rotate in at least one direction in response to the vibrating motor body, and coupling at least one unbalanced mass to the shaft and moving the unbalanced mass with the shaft to generate human-detectable vibrations in response to a motion of the shaft.

Various exemplary embodiments of this technology offer many advantages. For example, the ultrasonic vibration motor achieves unidirectional shaft rotation, higher efficiency and rotational speed than conventional motors while at the same time being less expensive and less complicated to manufacture. Additionally, exemplary embodiments of this ultrasonic motor uses a standing-wave tube design with cylindrical bushing contacts where the centripetal force generated by the unbalanced mass generates the friction force at the bushing contacts. Contact between the vibrating tube and rotating shaft to increase efficiency, and a single phase electronic circuit to produces the standing wave vibration that produces shaft rotation.

BRIEF DESCRIPTION OF THE DRAWINGS

FIG. 1C is an end view of the tubular motor body of the haptic actuator;

FIGS. 10A and 10B show example resonant first bending orthogonal modes for tubular motor body of the haptic actuator;

FIG. 13A-13C show the end view, the side view, and the isometric view, respectively, of an example haptic actuator with a radial preload;

DETAILED DESCRIPTION

Figure 1A:
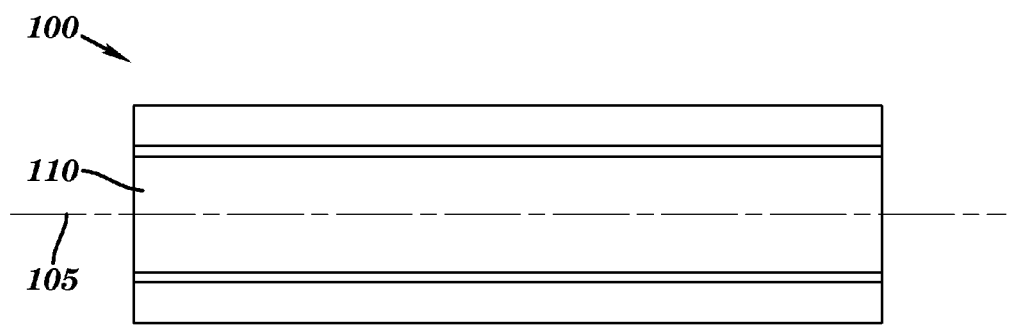
FIG. 1A is a side view of tubular motor body of an exemplary haptic actuator of FIG. 11A.
Figure 1B:
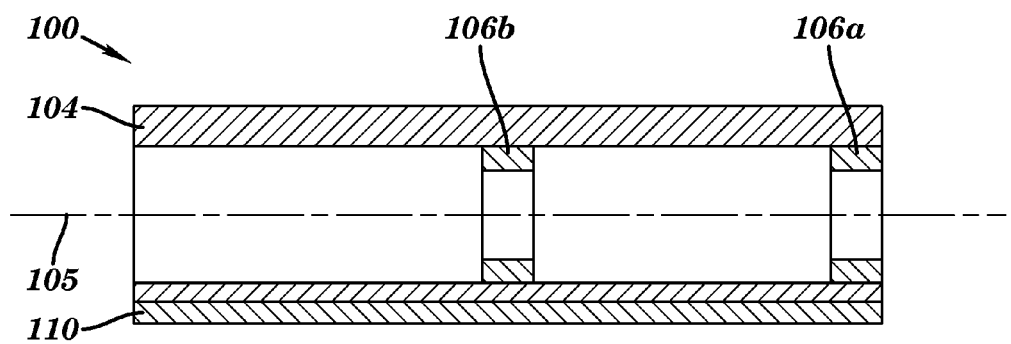
FIG. 1B is a cross section view of tubular motor body of the haptic actuator.
Figure 1D:
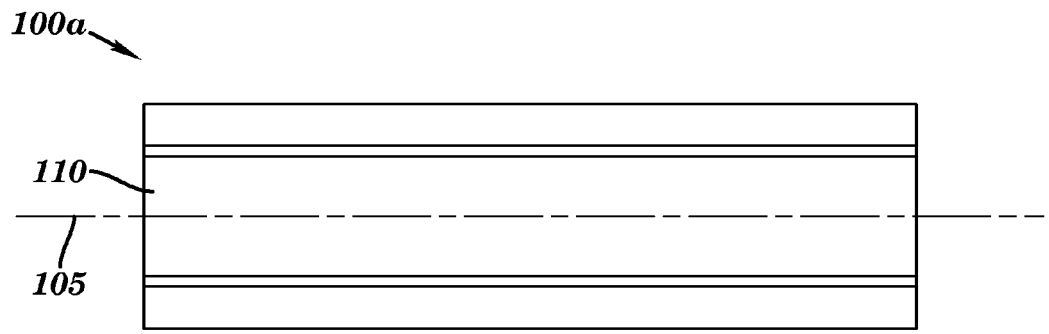
FIG. 1D is a side view of another example of tubular motor body of the haptic actuators of FIGS. 15A and 16A.
Figure 1E:
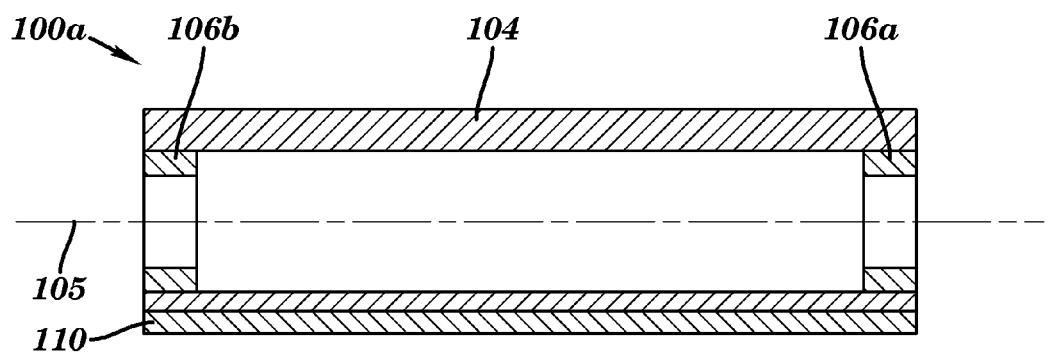
FIG. 1E is a cross section view of the tubular motor body of the haptic actuators of FIGS. 15A and 16A.

Referring to FIGS. 1A through 7C, exemplary embodiments of vibrating motor bodies 100 and 100a are shown and described. More specifically, referring to FIG. 1A, a side view of a vibrating motor body 100 is illustrated. As shown in more detail in FIG. 1B, vibrating motor body 100 comprises a tube 104 forming a tubular body of vibrating motor body 100, a piezoelectric ceramic plate 110, and interior cylindrical bushings 106a and 106b each located respectively at one end and a center (or, a middle portion) of an inside surface of the vibratory motor body 100. Tube 104 may be constructed of a solid material, including by way of example metals, polymers and ceramics, that vibrates with low loss and high mechanical quality factor (Q) at ultrasonic frequencies up to several hundred kilohertz, although other materials having these properties may be used. Piezoelectric ceramic plate 110 (also referred to herein as piezoelectric plate 110, or simply plate 110) is bonded to tube 104 using high strength adhesive, although other attachment methods may be used. Piezoelectric ceramic plate 110 can be arranged on an outside surface of tube 104 of the vibrating motor body 100 in a plurality of ways. For example, piezoelectric ceramic plate 110 has a plane parallel to axis 105 of the tubular body and is configured to bend the tubular body by creating ultrasonic vibrations at resonant bending modes in two orthogonal planes parallel to the axis 105 of the tubular body of vibrating motor body 100 when electrically energized, the ultrasonic vibrations causing a shaft (e.g., shaft 210 described below in FIG. 11A) to rotate in the at least one direction. According to one example, vibrating motor body 100 forms an ultrasonically vibrating motor body, as will be described below. Referring to FIGS. 1D and 1E, the vibrating motor body 100a is the same as vibratory motor body 100 except the cylindrical bushings 106a and 106b are located at both ends of the tube 104.

Figure 2:
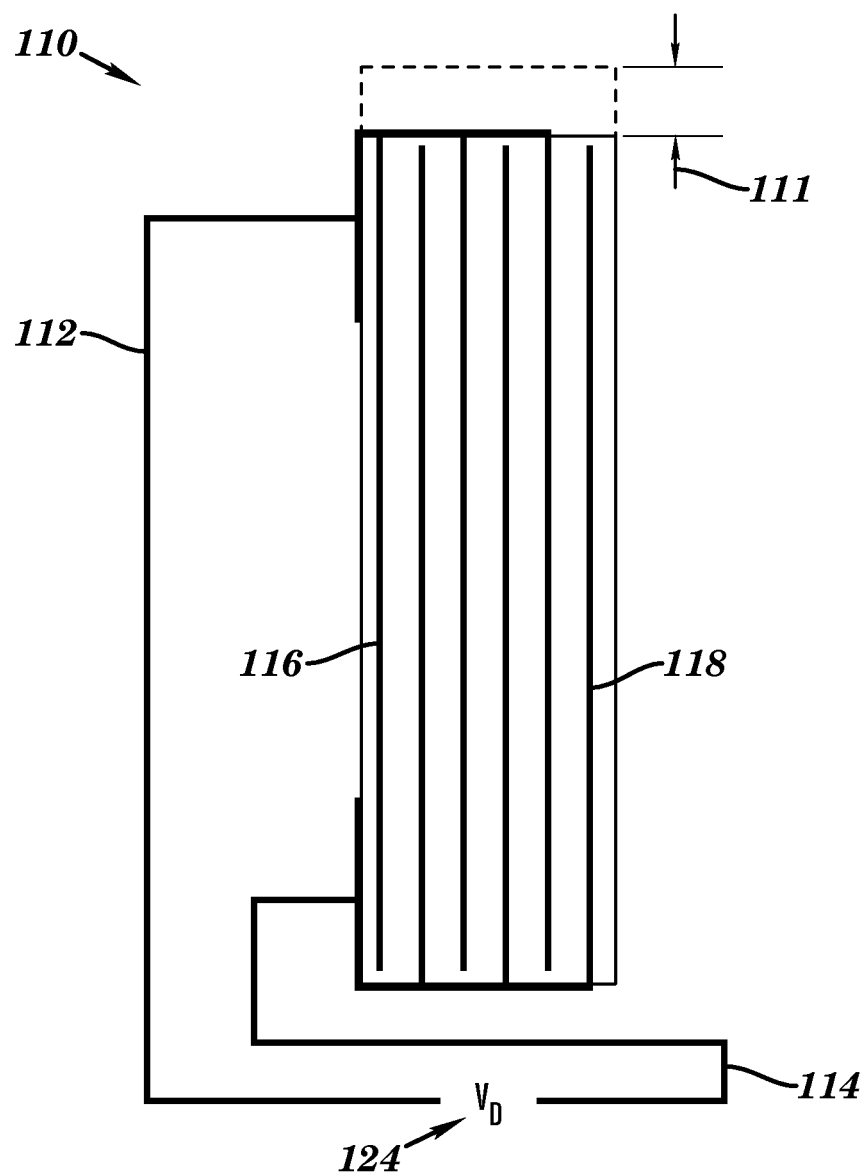
FIG. 2 is a cross section view of a multi-layer piezoelectric plate used in exemplary embodiments of the haptic actuators.

Referring to FIG. 2, an exemplary piezoelectric ceramic plate 110 is a co-fired multi-layer device with interdigitated electrodes 116 and 118 connected to external leads 112 and 114 respectively. Alternatively, a single layer piezoelectric plate may be used to form piezoelectric ceramic plate 110. In one example, when a voltage $V_D$ 124 is applied across two L-shaped electrodes shown in FIG. 2, a length of piezoelectric ceramic plate 110 changes by a length 111 due to the d33 effect, well known to one of ordinary skill in the art. By way of example only, further explanation of piezoelectric ceramic material used to make piezoelectric ceramic plate 110 and how it is used to generate ultrasonic vibrations is described in detail in US Patent Application Publication No. 2010/0039715, entitled "Reduced-Voltage, Linear Motor Systems and Methods Thereof," which is hereby incorporated by reference in its entirety, and will not be described in detail herein.

Figure 13C:
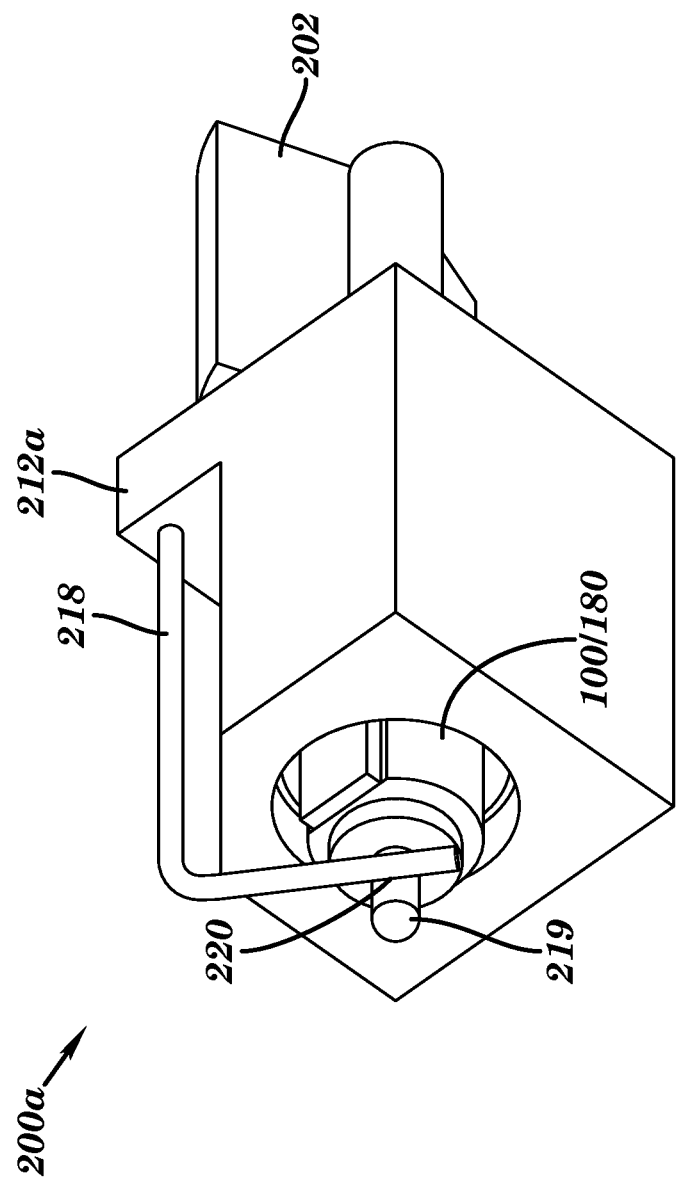
Figure 16A:
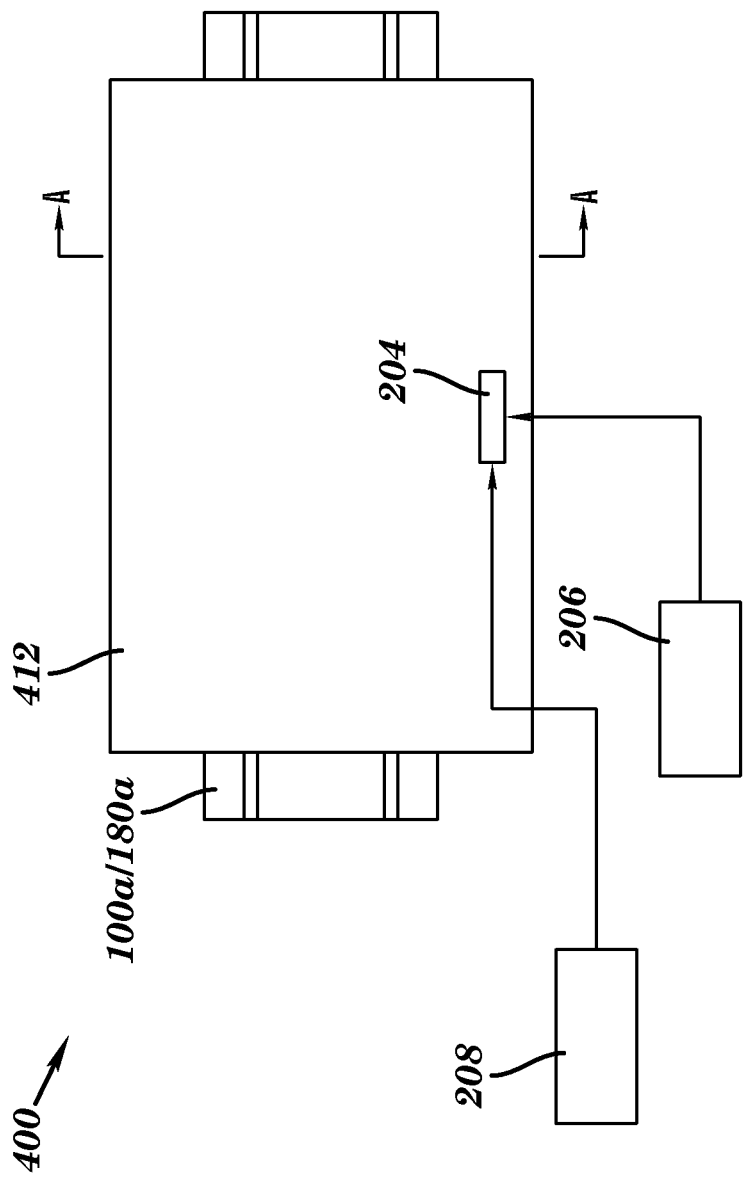
FIGS. 16A-16D show the side view and schematic, the end view cross section, the end view, and the side view cross section respectively, of an example haptic actuator.
Figure 16C:
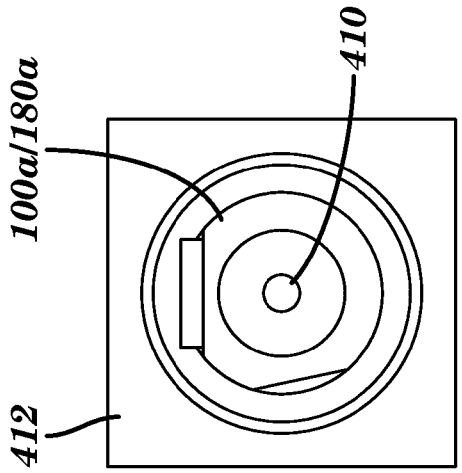
Figure 16B:
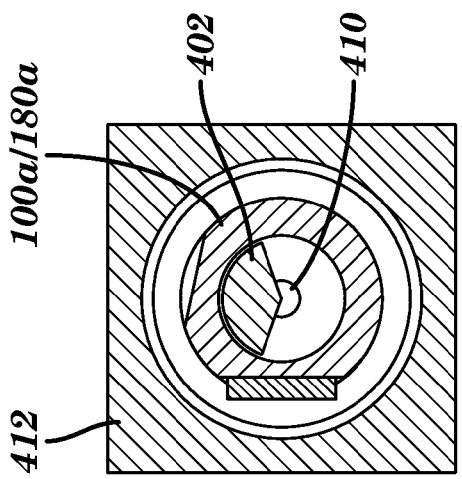
Figure 16D:
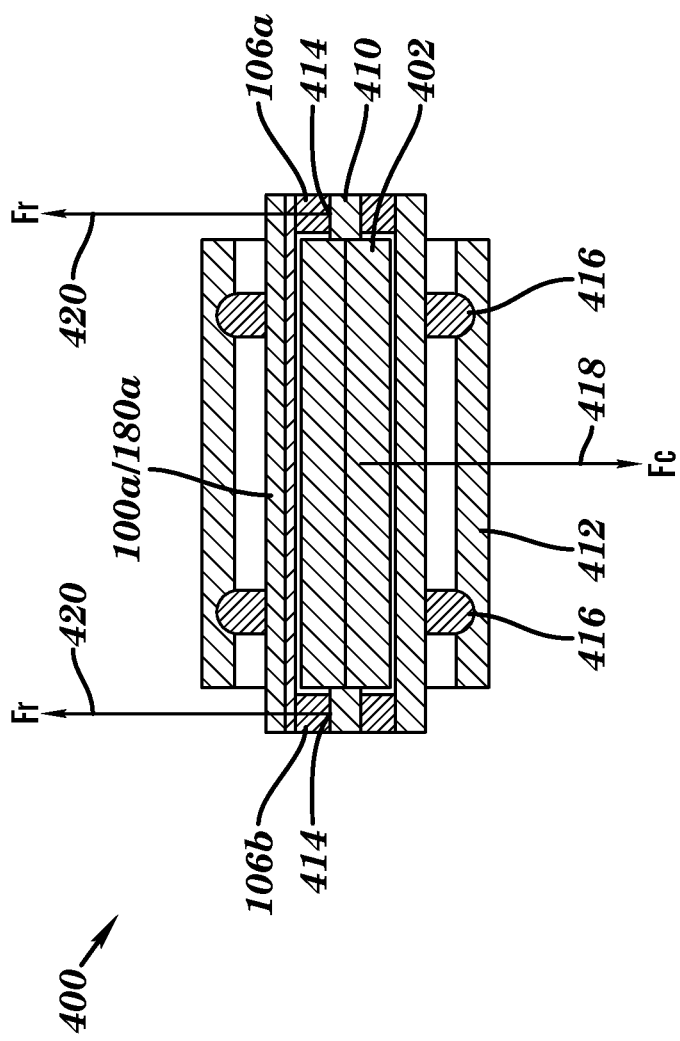

Referring back to FIG. 1B, cylindrical bushings 106a and 106b are bonded to an inside surface of tube 104 using high-strength adhesive but other attachment methods are also possible. According to some examples, cylindrical bushings 106a and 106b can be constructed of any hard and durable material that is compatible with rotating motor shafts 210, 219, and 410 which are shown in FIGS. 11C, 13C and 16D, respectively, although this compatibility is not a limitation. Exemplary materials for bushings 106a and 106b include steel, bronze, and aluminum oxide, although other materials may be used.

Figure 3:
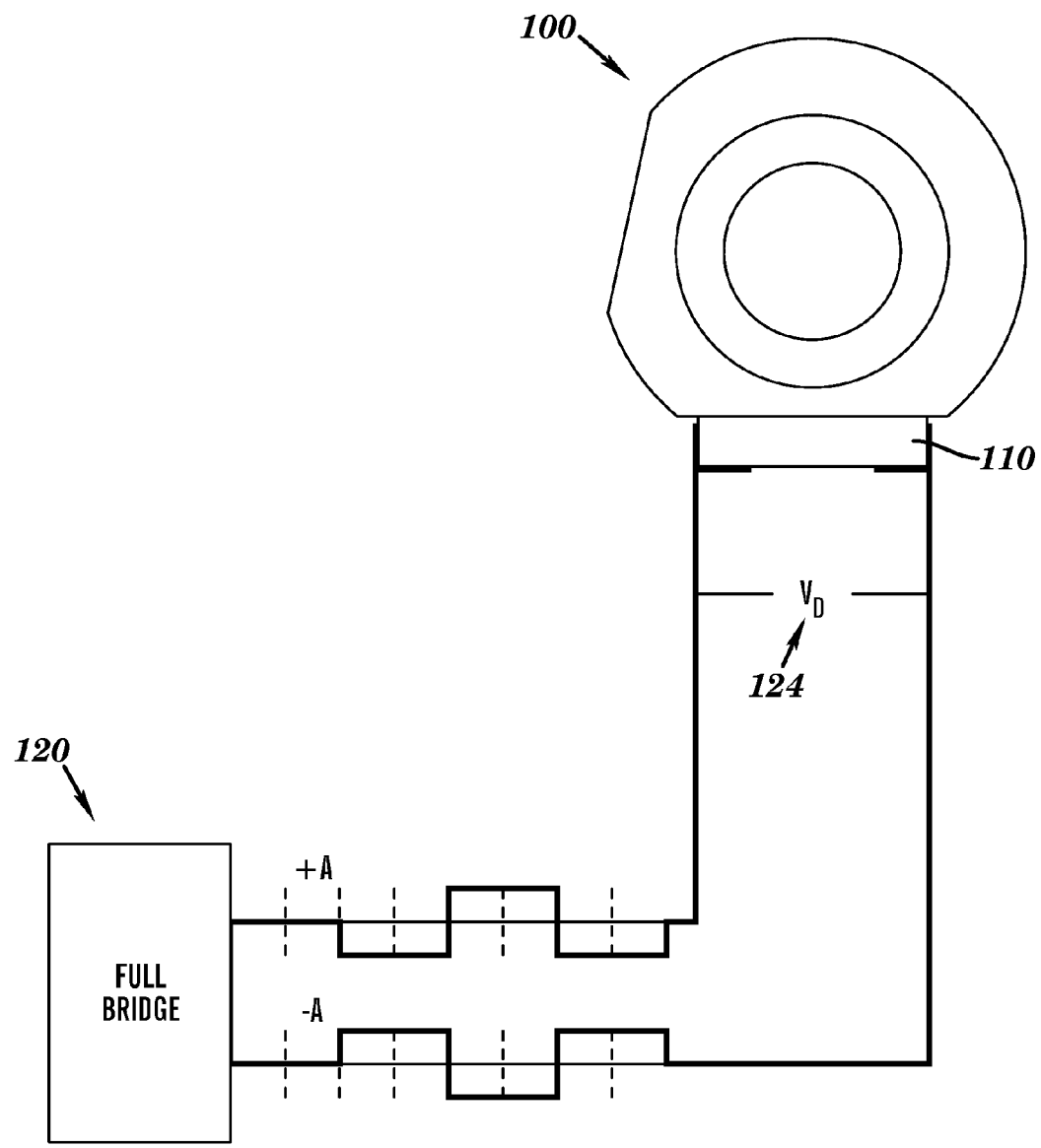
FIG. 3 is a schematic of the drive circuit and waveforms for driving the haptic actuator according to various exemplary embodiments.

Referring to FIG. 3, in one example, the vibrating motor body 100 is operated by a full bridge drive circuit 120, connected to piezoelectric ceramic plate 110. In this example, the frequency of the full bridge drive circuit 120 is substantially the same as a first bending mode resonant frequency of tubular vibrating motor body 100, although other frequencies (e.g., partially resonant frequencies) and other types of drive circuits (e.g., half-bridge drive circuits) may be used. Further description of this drive method is found in the above-referenced U.S. Patent Application Publication No. US2010/0039715, and will not be described in detail herein.

Figure 4B:
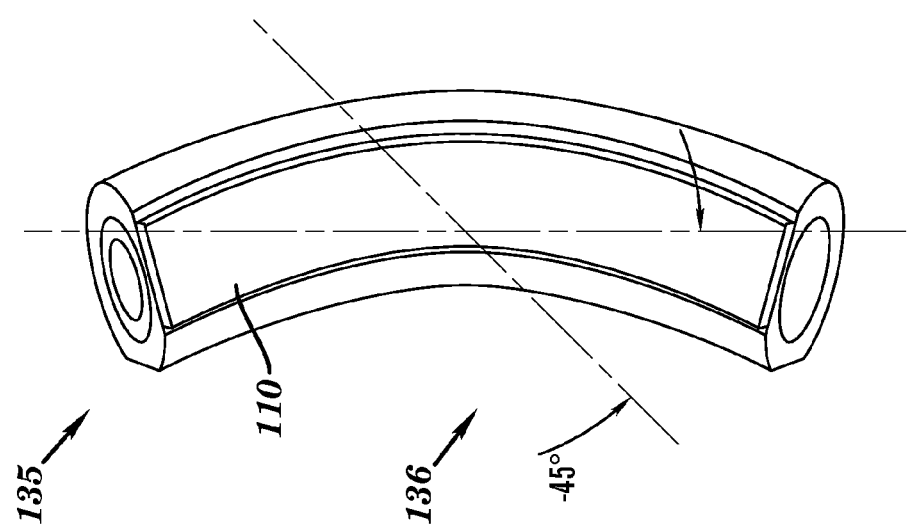
FIGS. 4A and 4B show the resonant first bending orthogonal modes.
Figure 4A:
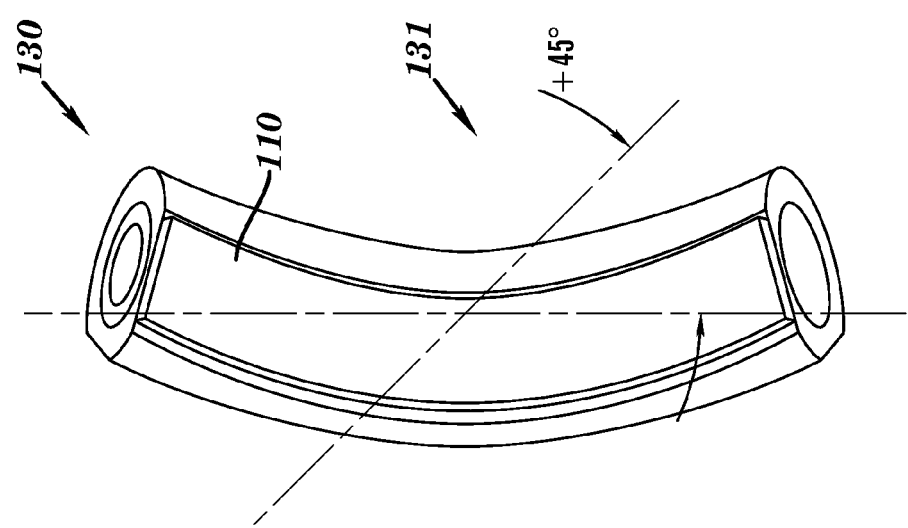

Referring to FIGS. 1C, 4A and 4B, according to one example, the cross section shape of tube 104 is not symmetric around the axis of the tube and the cross-section shape is created so that the bending of the vibrating motor body 100, induced by the change in length 111 of piezoelectric ceramic plate 110 when excited at substantially the first bending mode resonant frequency of motor body 100, produces first bending mode resonant vibrations in the planes −45 degrees (shown as element 101 in FIG. 1C) and +45 degrees (shown as element 103 in FIG. 1C) that are substantially 90 degrees out of phase and the vibration amplitudes are substantially equal.

Referring specifically to FIG. 1C, the exemplary vibrating motor body 100 achieves the desired phase and amplitude of vibration by adjusting a side cut depth d (shown as element 107) as well as an angle θ (shown as element 108) leading to an example cross-section shape as shown, although other parameters in the vibrating motor body 100 cross section may be adjusted to achieve the desired phase and amplitude performance.

Referring to FIGS. 4A through 7C, example results of the cross section shape of vibrating motor body 100 in FIG. 1C are shown. Referring specifically to FIGS. 4A and 4B, two first order bending mode resonances 130 and 135, respectively, exist in the vibrating motor body 100 that are substantially symmetrically aligned at +45 degrees (shown as element 131) and −45 degrees (shown as element 136), respectively, from the 0 degree plane of piezoelectric ceramic plate 110. The two 45 degrees angle bending modes 130 and 135 can have slightly different resonant frequencies and can be along two orthogonal planes, for example, although other non-orthogonal planes of piezoelectric ceramic plate 110 may be used. In this example, piezoelectric ceramic plate 110 is driven as shown in FIG. 3 at an average frequency of the resonant frequencies for bending modes 130 and 135 and energizes resonant vibrations in both bending modes 130 and 135.

Figure 5A:
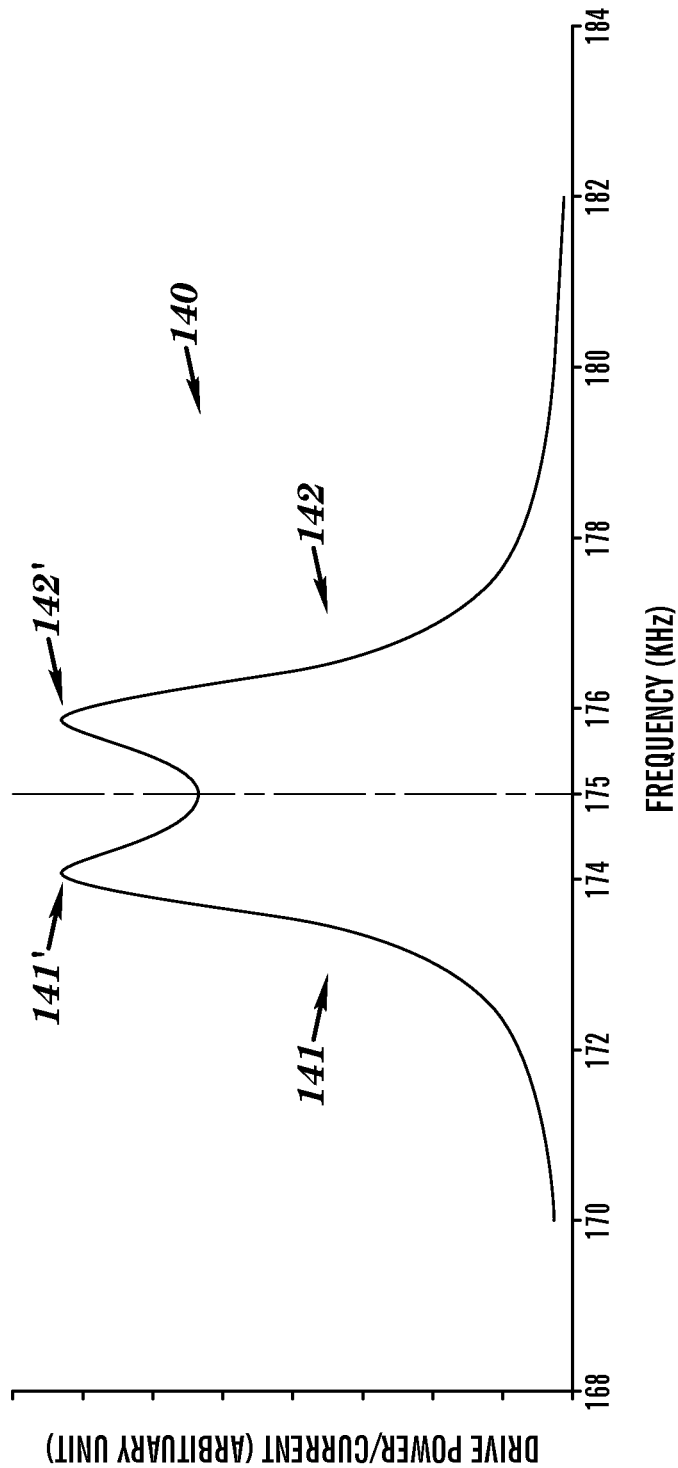
FIGS. 5A and 5B show examples of frequency versus amplitude plots for various embodiments of haptic actuators.
Figure 5B:
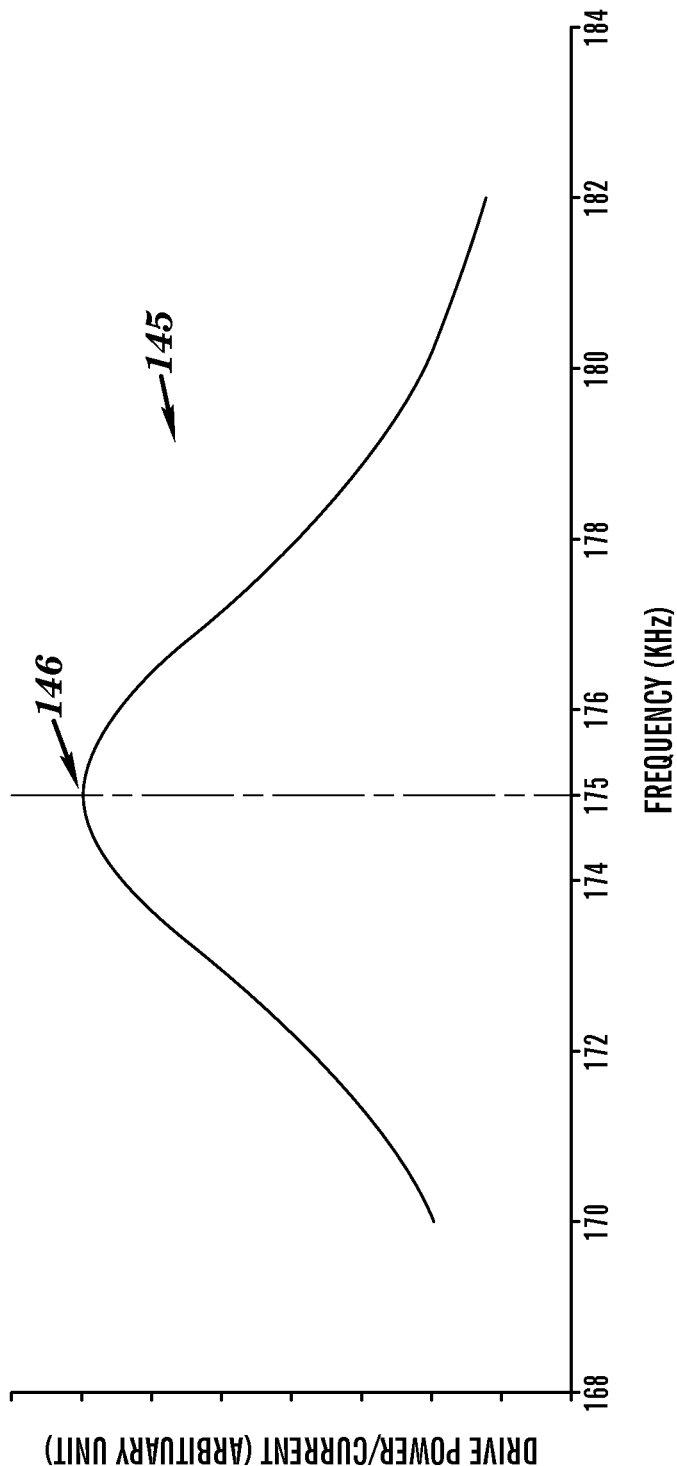

Referring to FIGS. 5A and 5B, this example shows vibration displacement versus frequency in plots 140 and 145. In this example, the resonant frequency of one of the 45 degree modes 130 shown as frequency plot portion 141 is 174 KHz and the resonant frequency of the other 45 degree mode 135 shown as frequency plot portion 142 is 176 KHz mode, although other frequency values may be used. The frequency of the drive signal $V_D$ 124 that is applied to piezoelectric ceramic plate 110 is the average of the resonant frequencies of two 45 degree bending modes 130 and 135, i.e., frequency plot portions 141 and 142, respectively, and is equal to 175 KHz in this example. When piezoelectric ceramic plate 110 is driven at 175 KHz the resonant modes 130 and 135 shown in FIGS. 4A and 4B have a natural phase shift of 90 degrees. Thus a single bending vibration input from piezoelectric ceramic plate 110 produces two bending modes 130 and 135 near the resonant frequencies of two 45 degree bending mode frequencies shown by frequency plot portions 141 and 142 along two substantially orthogonal planes of the piezoelectric ceramic plate 110. In one example, the amplitudes of vibration of the two bending modes 130 and 135 are substantially the same, although unequal amplitudes may be used.

Referring specifically to FIG. 5A, an example of vibrating motor body 100 with a high mechanical gain (or, high Qm) is plotted 140 with two peaks 141' and 142' corresponding to bending modes 130 and 135, respectively, that are distinct but are not necessarily equal in height. In one example, an operating frequency or drive frequency for piezoelectric ceramic plate 110 is at a middle of the two peaks 141' and 142'.

Referring to specifically to FIG. 5B, another example of vibrating motor body 100 with a lower Qm is shown as plot 145 where the two peaks (or, peak frequencies) 141' and 142' of bending modes 130 and 135 blend together into one single peak 146. For this example, an operating drive frequency for piezoelectric ceramic plate 110 is at the peak amplitude.

Figure 6A:
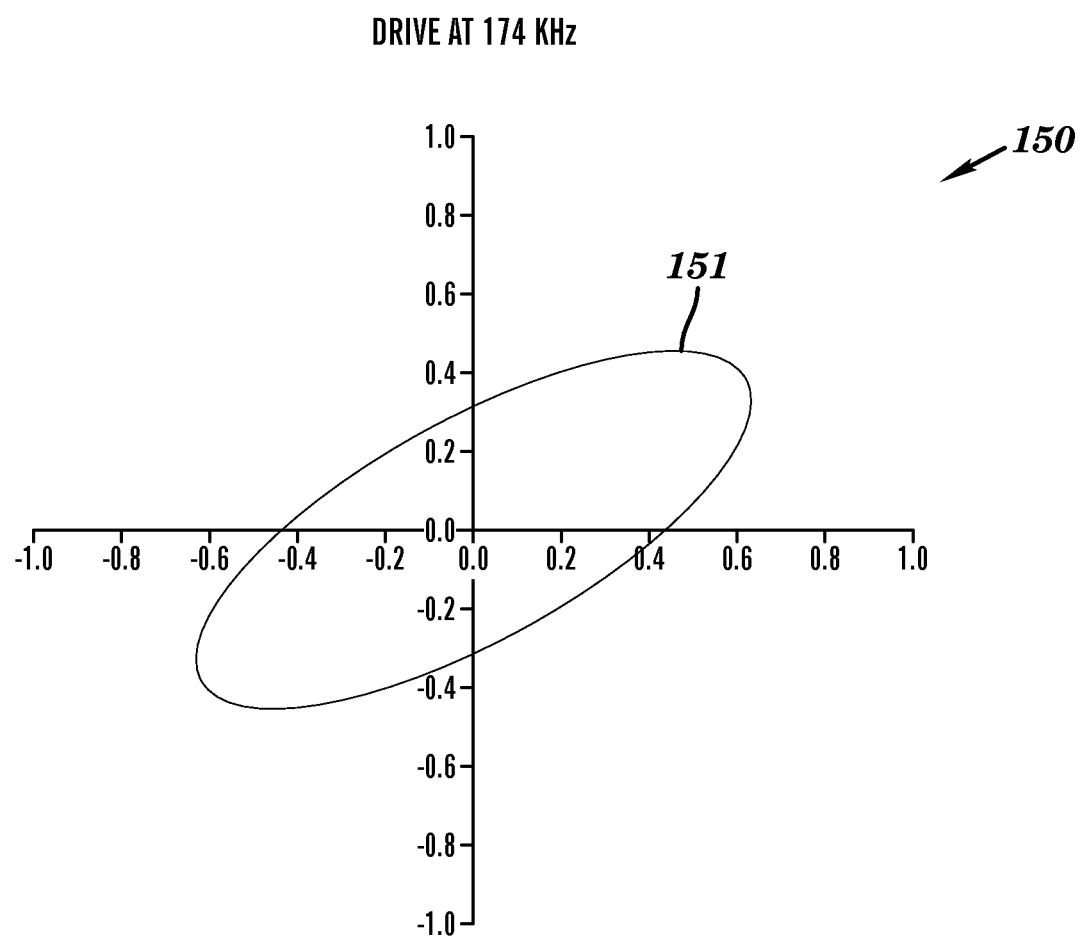
FIGS. 6A through 7C show examples of Lissajoule plots (also known as Lissajous plots) of the amplitudes for the two orthogonal resonant first bending modes.
Figure 6B:
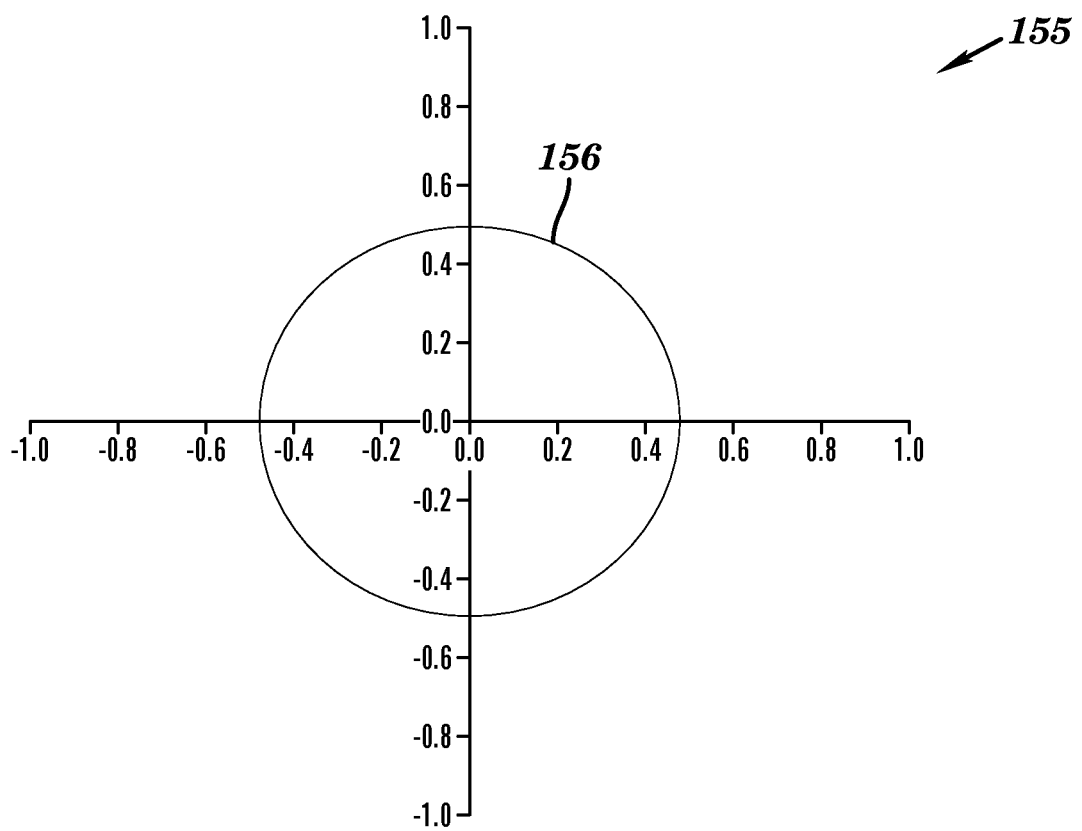
Figure 6C:
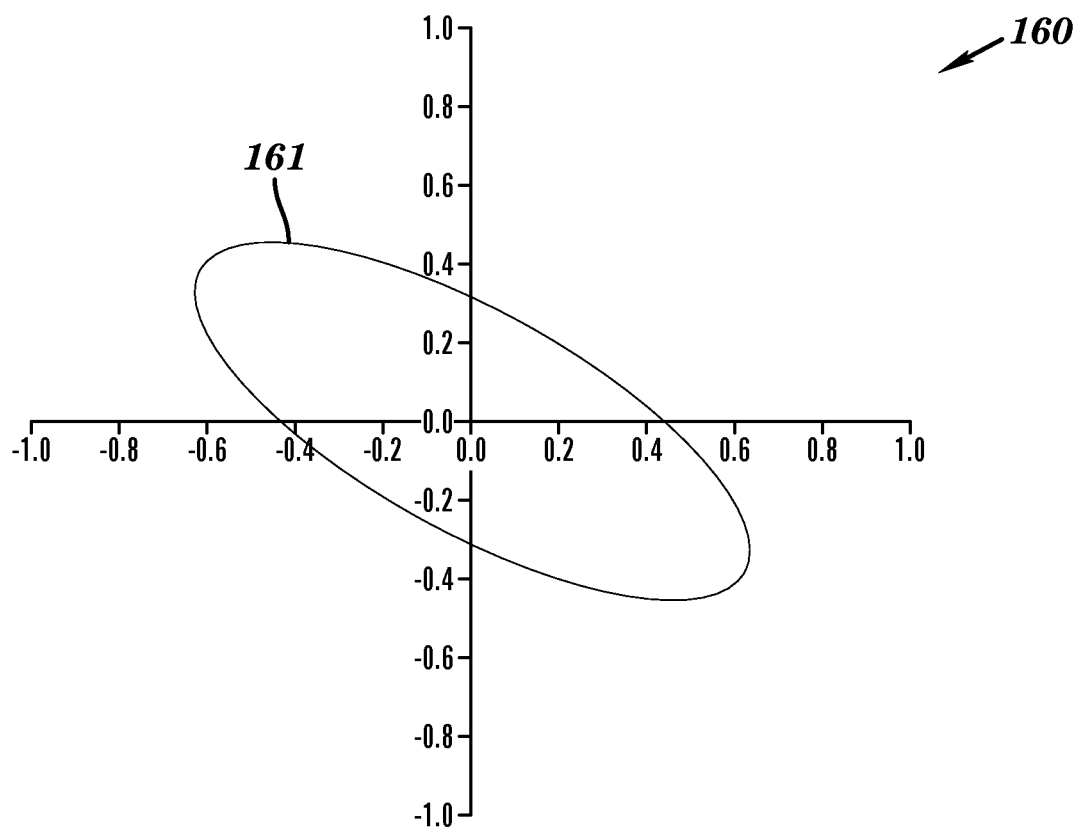

Referring to FIGS. 6A through 7C, the amplitudes of the two 45 degree resonant modes 130 and 135 are plotted using Lissajoule charts for a given input drive frequency for plate 110. Referring specifically to FIGS. 6A through 6C the Lissajoule plots for an exemplary fixed Qm=90 which corresponds to the frequency versus displacement plot 140 shown in FIG. 5A. Plot 150 shows an elliptical shape 151 when the input drive frequency for piezoelectric ceramic plate 110 equals 174 KHz which equals the peak frequency 141' (shown in frequency plot portion 141) of the first 45 degree bending mode 130. Plot 155 shows the ideal circular shape 156 when the input drive frequency for piezoelectric ceramic plate 110 equals 175 KHz which equals the average of the peak frequencies 141' and 142' of the 45 degree bending modes 130 and 135, respectively. Plot 160 shows the shape 161 when the input drive frequency for piezoelectric ceramic plate 110 equals 176 KHz which equals the peak frequency 142' (shown in frequency plot portion 142) of the other 45 degree bending mode 135. In this example, the circular plot 156 is the frequency that uses the highest power from the full bridge drive circuit 120 and by monitoring power versus frequency and adjusting the frequency to the value of greatest power, the best operating point with the most circular Lissajoule plot can be maintained. Further explanation of this method of adjusting drive frequency is described in U.S. patent application Ser. No. 12/466,929, entitled "Automated Drive Frequency Control for Resonant Actuator Systems and Methods Thereof," which is hereby incorporated by reference in its entirety, and will not be described in detail herein.

Figure 7A:
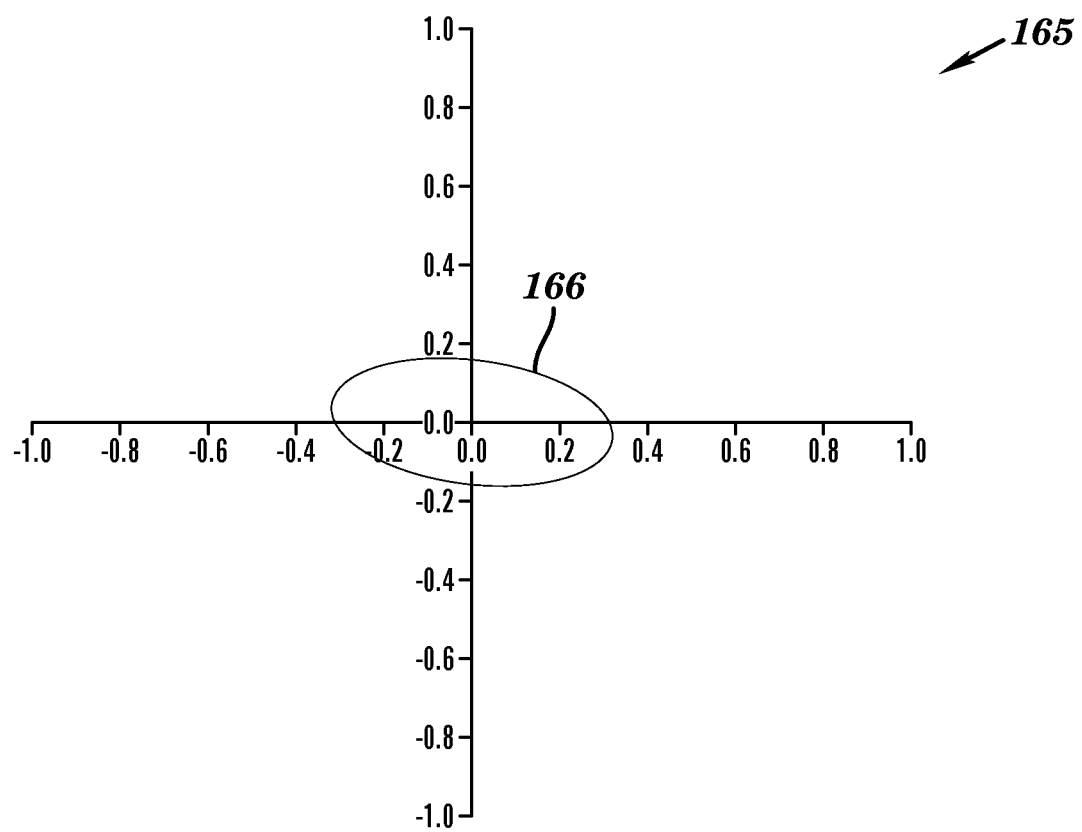
Figure 7B:
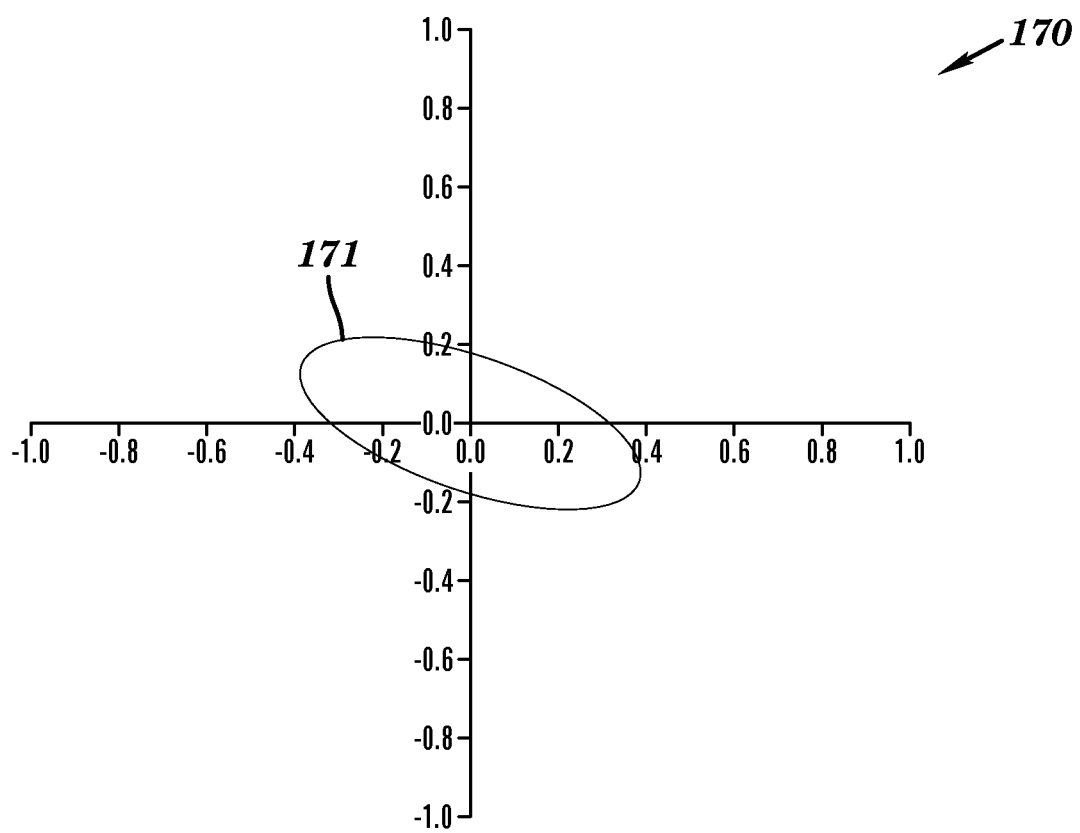
Figure 7C:
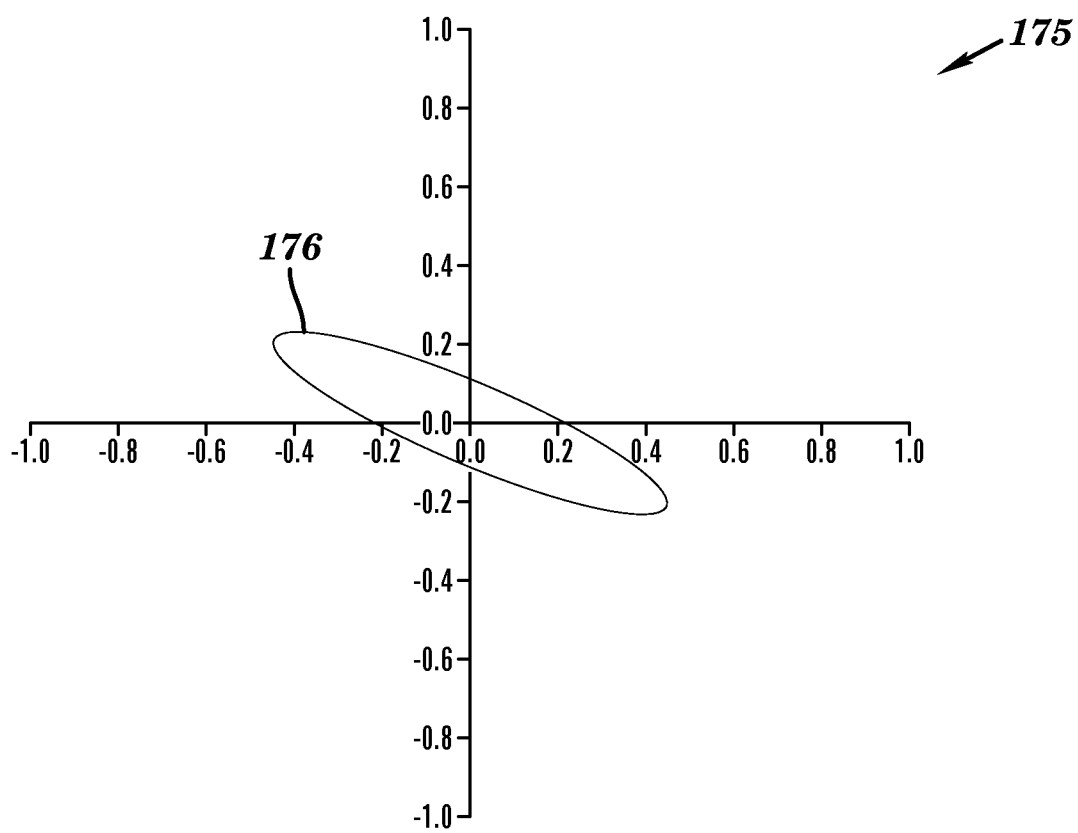

Referring to FIGS. 7A through 7C, amplitudes of the two 45 degree resonant bending modes 130 and 135 of FIGS. 4A and 4B, respectively, are plotted using Lissajoule charts for a given input drive frequency for piezoelectric ceramic plate 110. The Lissajoule plots 166, 171 and 176 are shown for the examples when quality factors (Qm) are lower and not equal. In this example, Qm is 30 for the 45 degree mode 130 with a resonant frequency at 174 KHz and Qm is 60 for the 45 degree mode 135 with a resonant frequency of 176 KHz. Plot 165 shows an elliptical shape 166 when the input drive frequency for piezoelectric ceramic plate 110 equals 174 KHz which equals the peak frequency 141' of the first 45 degree bending mode 130. Plot 170 shows a larger elliptical shape 171 when the input drive frequency for piezoelectric ceramic plate 110 equals 175 KHz which equals the average of the peak frequencies 141' and 142' of the 45 degree bending modes 130 and 135, respectively. Plot 175 shows the shape 176 when the input drive frequency for piezoelectric ceramic plate 110 equals 176 KHz which equals the peak frequency 142' of the other 45 degree bending mode 142. In this example, the shape 171 is not circular, however, drive frequency of 175 KHz remains at the point of highest power and best performance as discussed above. It is to be noted that the frequency values and shapes illustrated above are by way of example only, and other values and shapes of Lissajoule charts may be used.

Figure 8A:
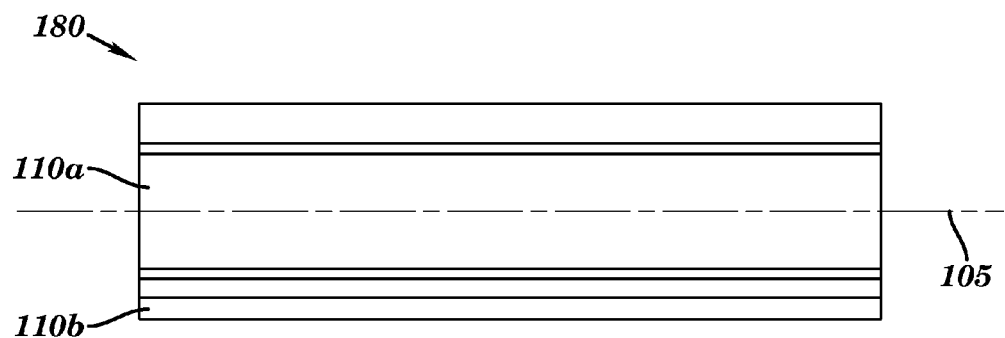
FIG. 8A is a side view of tubular motor body of another exemplary haptic actuator.
Figure 8B:
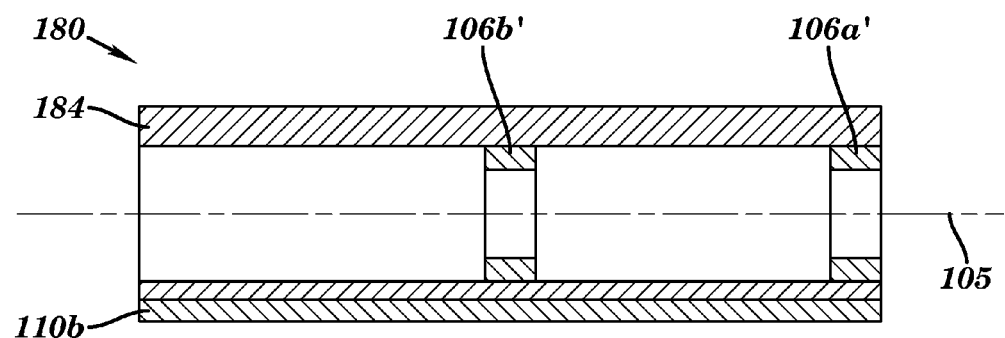
FIG. 8B is a cross section view of tubular motor body of the haptic actuator.

Referring to FIGS. 8A through 10B, another exemplary construction of a vibrating motor body 180 is illustrated. Vibrating motor body 180 is same as vibrating motor body 100 except as described below. Vibrating motor body 180 is attached to two piezoelectric ceramic plates 110a and 110b instead of one piezoelectric ceramic plate 110 attached to vibrating motor body 100. Referring to FIG. 8A through 8C, a tube 184 is bonded to two piezoelectric ceramic plates 110a and 110b and interior cylindrical bushings 106a' and 106b' coupled to an inside surface of vibrating motor body 180. Bushings 106a' and 106b' are located at one end and the center of the vibrating motor body 180. In this example, piezoelectric ceramic plates 110a and 110b are aligned at 90 degrees, although other relative angular arrangements between the piezoelectric ceramic plates 110a and 110b may be used. In this example, piezoelectric ceramic plates 110a and 110b change length and bend the vibrating motor body 180 in two orthogonal planes producing first bending mode vibrations, which can be ultrasonic vibrations for example. Referring to FIGS. 8D and 8E, the vibrating motor body 180a is the same as motor body 180 except the two cylindrical bushings 106a' and 106b' are located at both ends of the tube 184.

Figure 9:
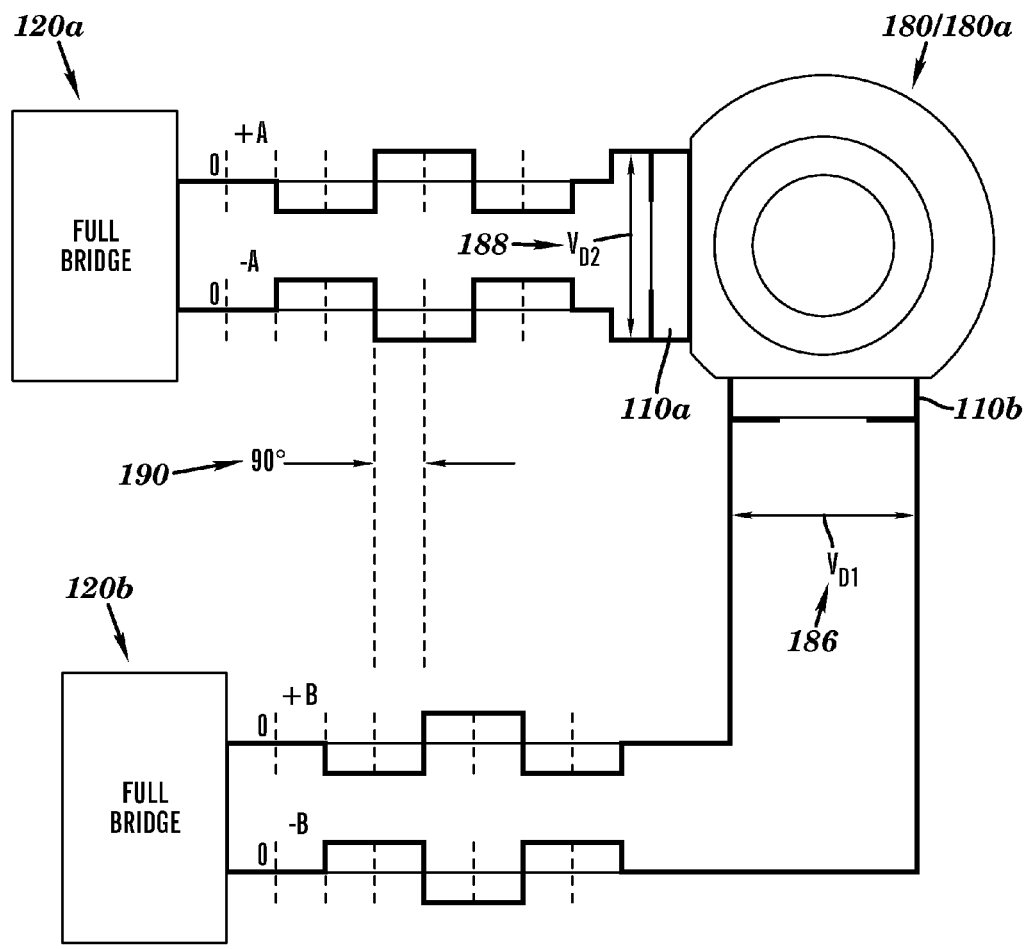
FIG. 9 is a schematic of the drive circuit and waveforms for the exemplary embodiments of the haptic actuator.

Referring to FIG. 9, the ultrasonically vibrating motor body 180 is operated by two full bridge drive circuits 120a and 120b connected to piezoelectric ceramic plates 110a and 110b. In one example, the drive signals 186 with a voltage $V_{D1}$ and 188 with a voltage $V_{D2}$ are operating at the first bending mode resonant frequency of the vibrating motor body 180, although other frequencies may be used. The phase shift 190 between drive signals 186 and 188 is substantially 90 degrees which matches the exemplary 90 degree orientation of piezoelectric ceramic plates 110a and 110b, although other values of phase shift 190 may be used depending upon relative angular orientation of piezoelectric ceramic plates 110a and 110b. Further explanation of this driving method is contained, for example, in the above-referenced U.S. Patent Application Publication No. 2010/0039715 and will not be described in detail herein.

Figure 8C:
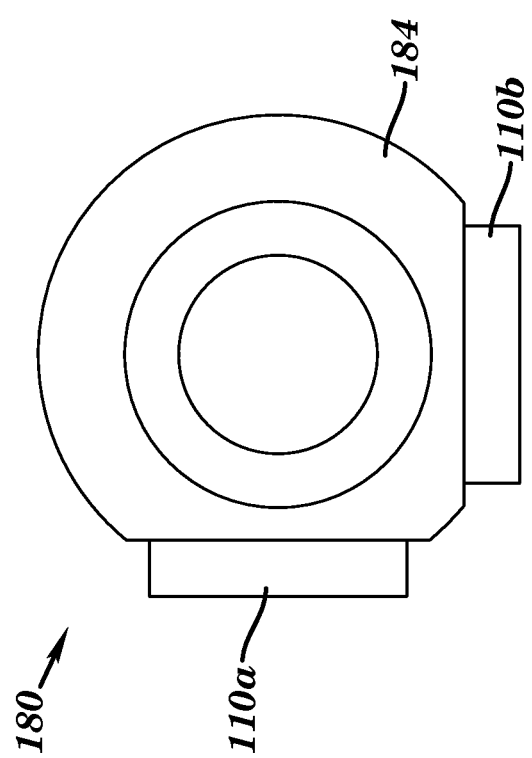
FIG. 8C is an end view of tubular motor body of the haptic actuator.
Figure 8D:
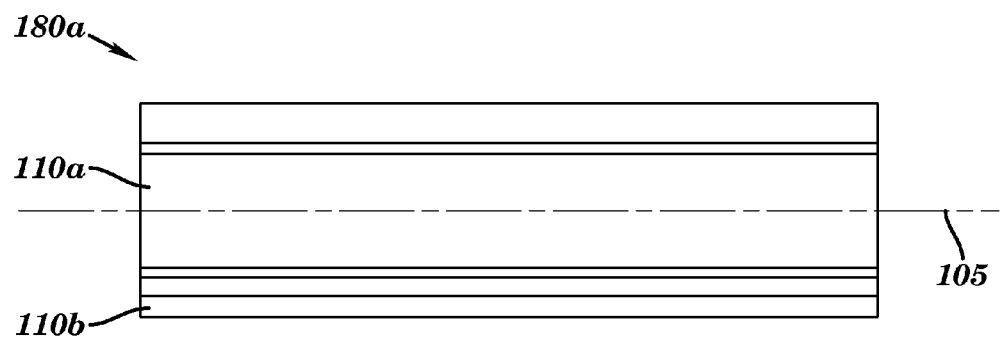
FIG. 8D is a side view of tubular motor body of the haptic actuator.

Referring to FIGS. 8C, 10A and 10B, the orthogonal resonant bending modes 192 and 194 of vibrating motor body 180 are shown. Two perpendicular piezoelectric ceramic plates 110a and 110b bend the vibrating motor body 180, although in alternative embodiments, piezoelectric plates 110a and 110b may have non-orthogonal relative orientation. The cross section shape of tube 184 is not symmetric around the axis of the tube, although according to some examples, a symmetric cross-section may be used. The non-symmetric shape is created so that the bending of vibrating motor body 180, induced by the change in respective lengths 111 of piezoelectric ceramic plates 110a and 110b, when excited at substantially the first bending mode resonate frequency of vibrating body 180 causes the two orthogonal bending resonant modes 192 and 194 to have substantially the same resonant frequency. In this example, the exact values of the orientation angle α (element 196) or β (element 198) for the orthogonal planes corresponding to two bending modes 192 and 194 are exemplary only and in this example, the two modes 192 and 194 are substantially perpendicular to each other where α+β=90°. Alternatively, the sum α+β may be equal to other values. As previously described, the two piezoelectric ceramic plates 110a and 110b are driven by electrical signals 186 and 188, respectively, that each have a phase shift 190 equal to 90 degrees which produces a substantially circular shaped Lissajoule plot of a displacement of the vibrating motor body 100.

Figure 11A:
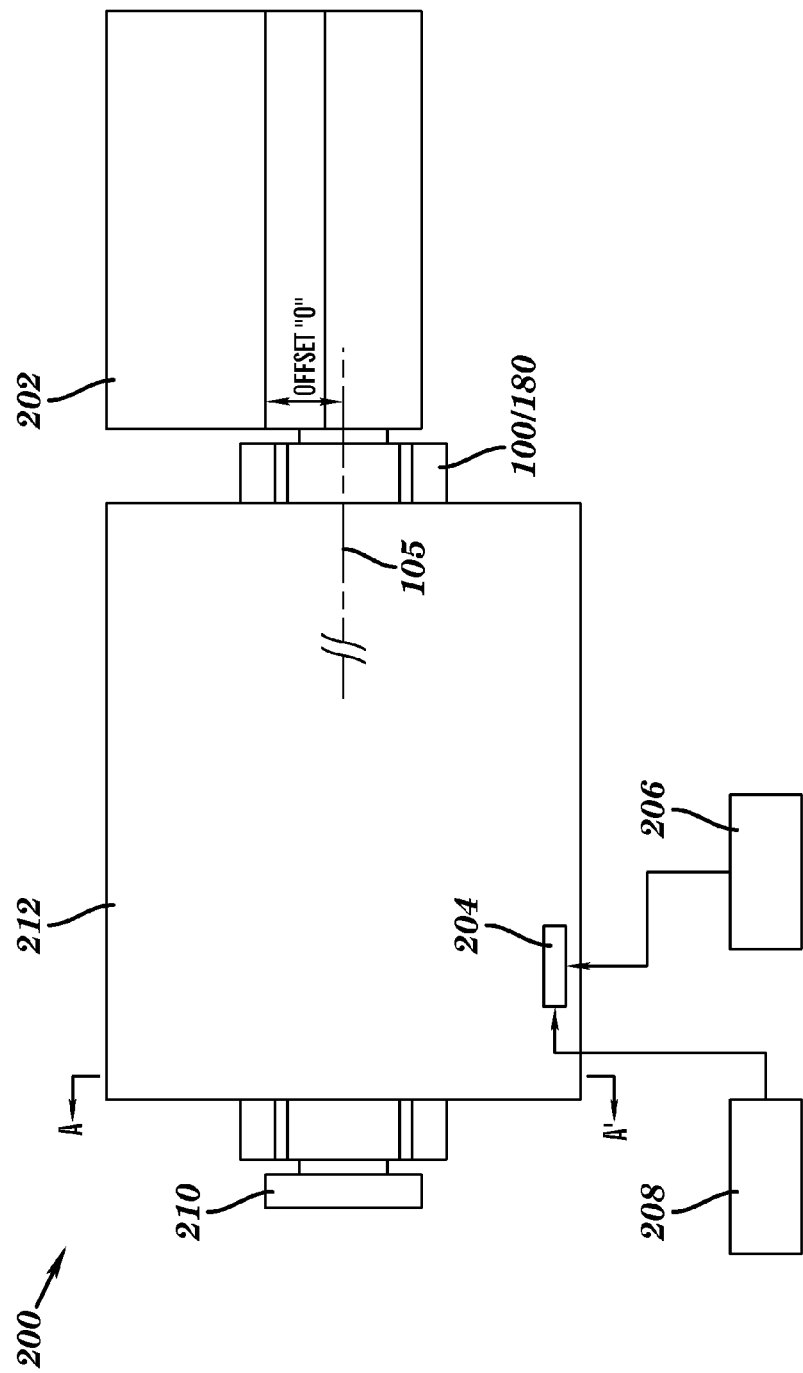
FIGS. 11A-11C shows the side view and schematic, the end view and schematic, and the cross section view and schematic of an example haptic actuator, respectively.
Figure 11C:
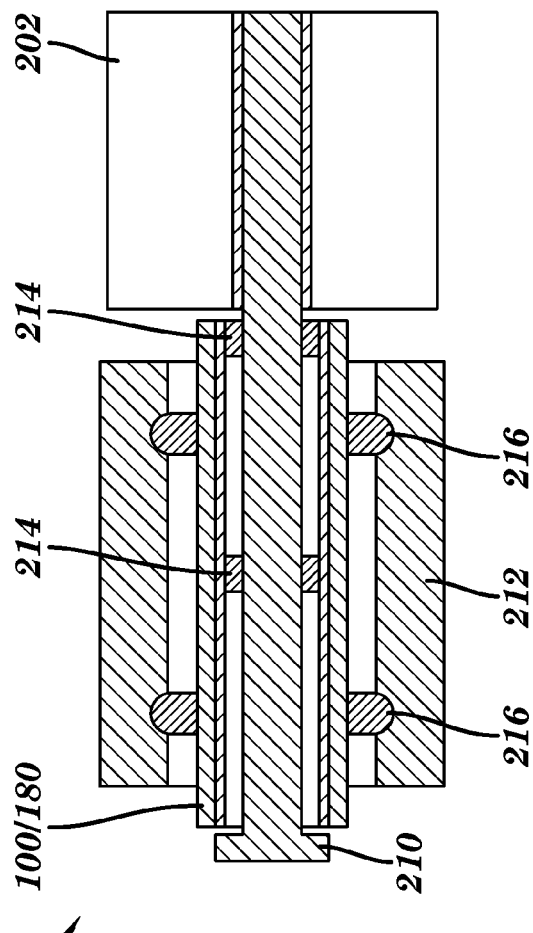
Figure 11B:
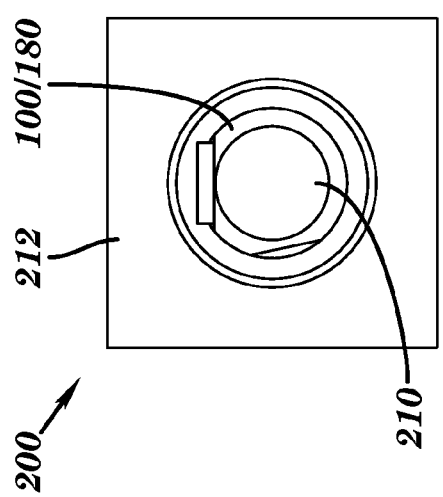

Referring to FIGS. 11A through 11C, a haptic actuator 200 has a housing 212 with an integrated vibrating motor body 100 (or equally, vibrating motor body 180) and integrated driver chip (IC) 204. A rotating shaft 210 is assembled inside the vibrating motor body 100 and a rotating unbalanced mass 202 is assembled to one end of rotating shaft 210. Unbalanced mass 202 is exemplarily referred to as "unbalanced" because of its asymmetrical shape and an offset "O" position from axis 105 (partially shown) of vibrating motor body 100/180. FIG. 11B illustrates a section view of haptic actuator 200 along AA' of FIG. 11A.

In one example, vibrating motor body 100/180 is secured to housing 212 using a semi-rigid elastomer at the vibration node points of vibrating motor body 100/180. An example of a silicone elastomer is DOW CORNING® 734 flowable sealant manufactured by Dow Corning Corporation of Midland, Mich., although other types of sealants manufactured by other manufacturers may be used. The node points on vibrating motor body 100/180 are the axial locations that vibrate with the smallest amplitude and provide the lowest damping of the vibration modes or resonant bending modes 130/135 or 192/194 as shown in FIGS. 4A/4B and 10A/10B, respectively above. Rotating shaft 210 frictionally contacts vibrating motor body 100/180 at cylindrical contact surfaces 214 shown in FIG. 11C, although other points of contact may be used. Unbalanced mass 202 is secured to one end of shaft 210 by press fit, adhesive, or other manners known to one of ordinary skill in the art. Integrated driver IC 204 contains the drive electronics and logic circuitry including at least one of the full bridge switching circuits, e.g., full bridge drive circuit 120 and the necessary digital control and frequency generating circuits to create the exemplary driving waveforms shown in FIG. 3 and FIG. 9. An example of the integrated driver IC 204 is the NSD-2101 manufactured by New Scale Technologies, Inc., of Victor, N.Y. For the example of the NSD-2101, the integrated driver IC 204 is connected to a DC voltage source 206 and an I²C serial control interface 208, although other driver ICs and other techniques of connection may be used, as may be contemplated by one of ordinary skill in the art, after reading this disclosure.

Figure 12:
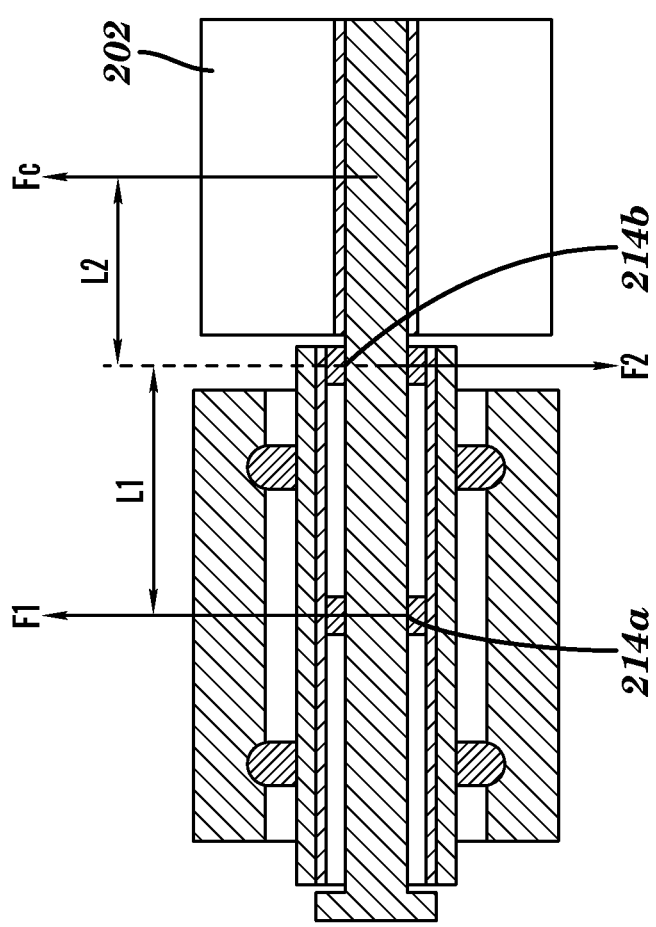
FIG. 12 shows the free-body force analysis of an example haptic actuator.

Referring to FIG. 12, exemplary reaction forces acting on cylindrical contact surfaces 214 are evaluated for both vibrating motor bodies of 100 or 180 for haptic actuator 200. In this example, force $F_c$ is the centripetal force generated by the unbalanced mass 202. Force F1 is the reaction force at a center contact point 214a and force F2 is the reaction force at an end contact point 214b. L1 is the axial distance between F1 and F2. L2 is the axial distance between F2 and Fc. The reaction forces F1 and F2 are a function of $F_c$, L1 and L2, and in this example are governed by the following equations:

$$F1 = (1+L2/L1)F_c,$$

$$F2 = (L2/L1)F_c,$$

$$F1+F2 = (1+2L2/L1)F_c, \text{ and}$$

$$\text{Friction Force} = (1+2L2/L1)F_c\mu,$$

where μ is the coefficient of friction. In this example, the sum of F1 and F2 is proportional to the total friction force generated at contact points 214a and 214b. An exemplary advantage of this design is the reaction forces F1, F2, created by the centripetal force $F_c$ on the cylindrical contact points 214a and 214b generate friction that is beneficial. In this configuration $F_c$ increases (F1+F2) by an amplification factor of (1+2L2/L1) as discussed above. As vibrating motor body 100/180 vibrates, contact points 214a and 214b generate a torque on the shaft to increase the overall motor efficiency which corresponds to higher rotational velocity at a lower input power to the haptic actuator 200. The arrangement of forces in FIG. 12 contrasts with conventional electromagnetic motors where the centripetal force generates friction at the shaft bushings that is a direct loss of efficiency and a corresponding loss of speed and increase in input power.

In one example, contact point 214a is located at a center of the vibrating motor body 100 (or equivalently, vibrating motor body 180) at the bottom of the cylindrical bushing 106b and contact point 214b is located at the end of vibrating motor body 100 (or equivalently, vibrating motor body 180) at the top of the cylindrical bushing 106a. These example locations of contact points 214a, 214b are selected to make optimum use of reaction forces F1 and F2 and bending modes 130/135 or 192/194 shown in FIGS. 4A/4B and 10A/10B, respectively, although other locations may be used, as can be contemplated by one of ordinary skill in the art after reading this disclosure. When vibrating motor body 100 (or equivalently, vibrating motor body 180) vibrates, torques generated at points 214a and 214b add together with minimum slippage to enhance the motor speed and efficiency.

Figure 14:
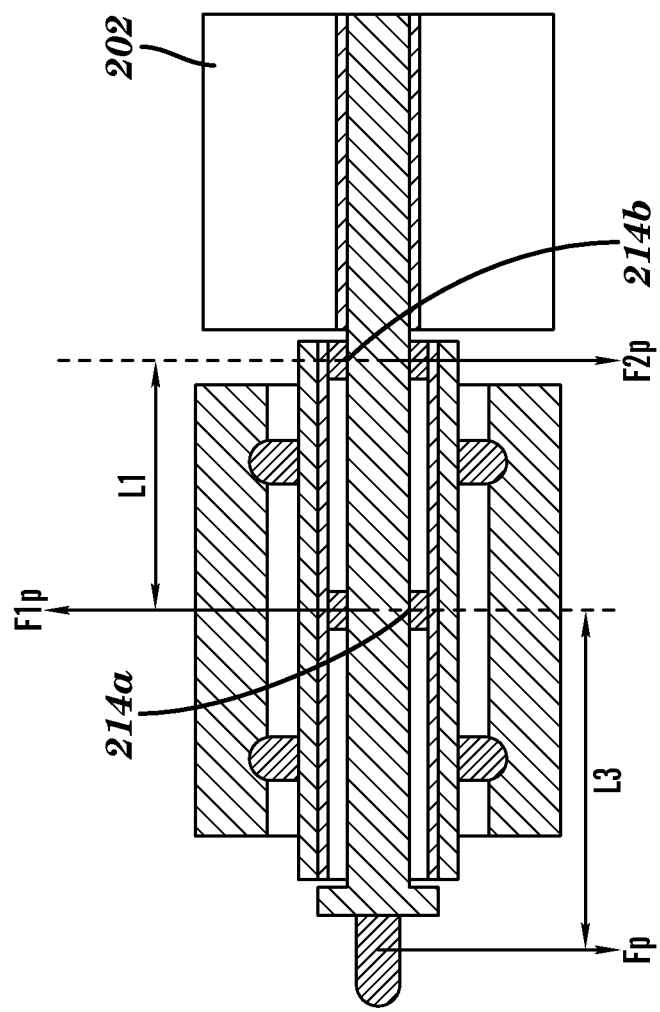
FIG. 14 shows the free-body force analysis of the example haptic actuator of FIGS. 13A-13C.

Referring to FIGS. 13A through 14, haptic actuator 200a is the same as haptic actuator 200 except a spring contact 218 is added to generate radial force Fp (shown in FIG. 14). The addition of radial force Fp creates consistent and higher friction at zero speed when rotating shaft 219 is just starting the rotational movement to result in a high starting torque and the centripetal force $F_c$ at that point is substantially zero or negligible compared to the starting torque. In this example, spring 218 is a formed wire with a low friction coating, although other constructions of spring 218 may be used. One end of spring 218 is fixed to housing 212a shown in FIG. 13B and bent to touch rotating shaft 219 at a contact point 220. The radial force at contact point 220 is Fp.

Referring to FIG. 14, in this example, the reaction forces F1p and F2p are a function of Fp, L3 and L1, and are governed by the following equations:

$$F1p=(1+L3/L1)Fp,$$

$$F2p=(L3/L1)Fp,$$

$$F1p+F2p=(1+2L3/L1)Fp, \text{ and}$$

Starting Friction Force=$(1+2L3/L1)Fp\mu$, where $\mu$ is an exemplary coefficient of friction.

As shown in the equations immediately above, preload force Fp is amplified by the (1+2L3/L1) at points 214a and 214b which insures the friction force generated at point 220 is much less than the starting friction force calculated in the equations above. This will lead to higher frictional starting torque at zero rotation speed when rotating shaft 219 just begins to move, higher acceleration and minimize the time required by rotating shaft 219 to reach a maximum velocity. It is to be noted that although spring 200 is illustrated above in an arrangement of haptic actuator 200a, based upon the information in this disclosure, one of ordinary skill in the art can incorporate spring 218 in other haptic actuators disclosed herein, for example, haptic actuator 200 describe above or haptic actuator 300 described below.

Figure 15A:
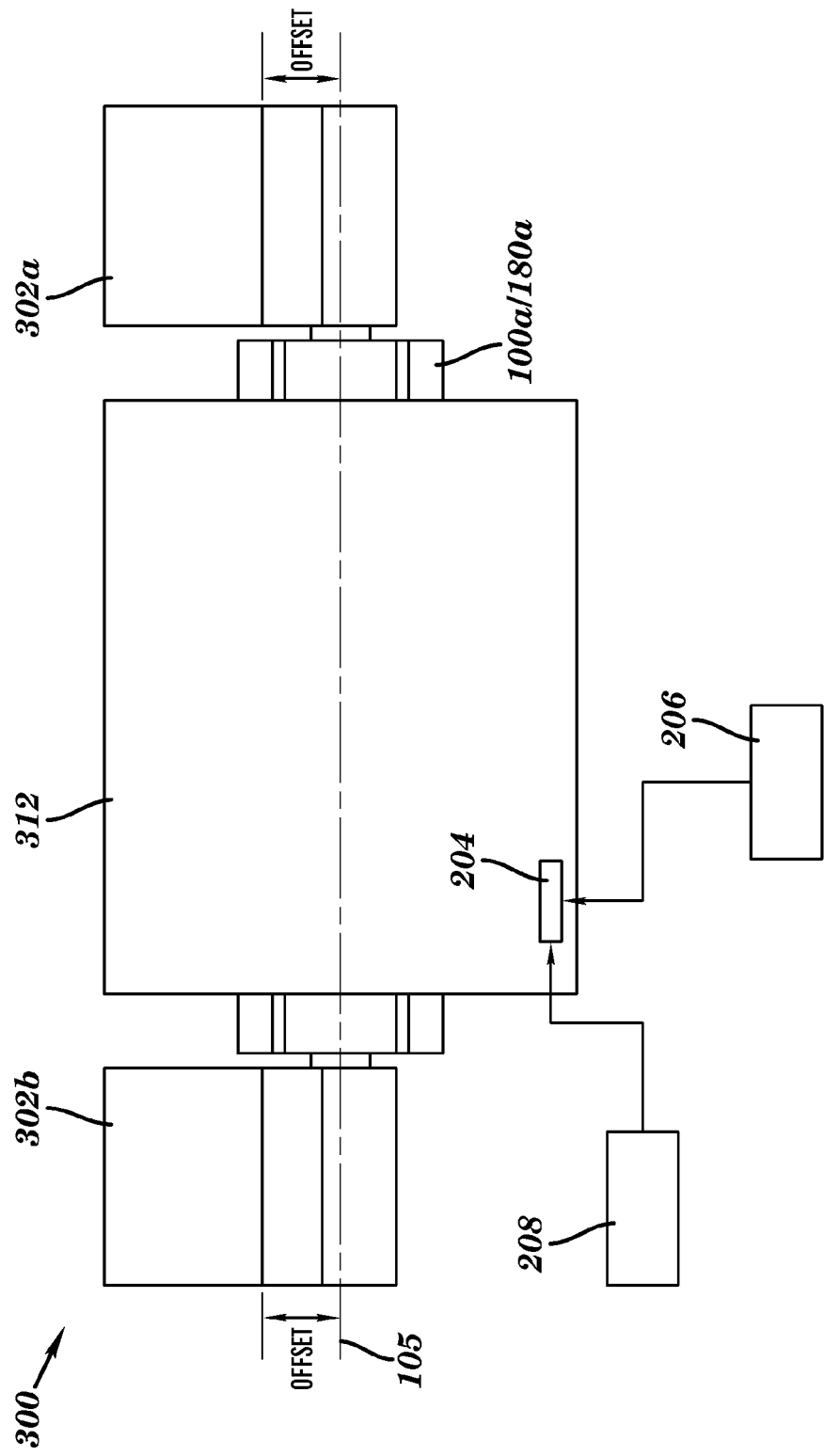
FIGS. 15A-15C show the side view and schematic, the end view and schematic, and the cross section view and schematic, respectively, of an example haptic actuator.
Figures 15B, 15C:
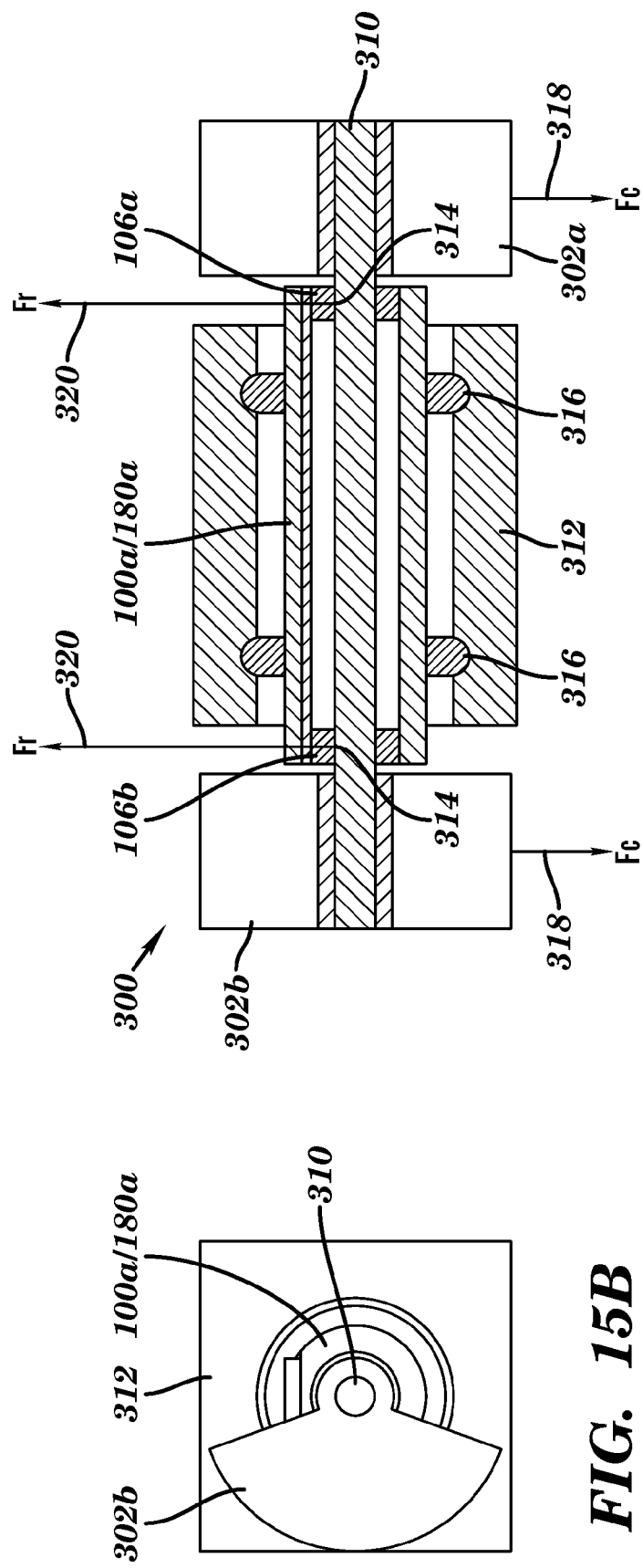

Referring to FIG. 15A through 15C, haptic actuator 300 is an alternative embodiment that is the same as haptic actuator 200 except a single unbalanced mass 202 is replaced by two substantially identical unbalanced masses 302a and 302b connected to both ends of rotating shaft 310, or opposing ends of rotating shaft 310, although in alternative embodiments, unbalanced masses 302a and 302b may not be substantially identical or equal. Haptic actuator 300 has a housing 312 with integrated vibrating motor body 100a/180a and an integrated driver IC 204. Rotating shaft 310 is assembled inside vibrating motor body 100a/180a and rotating unbalanced masses 302a and 302b are assembled to each respective end of rotating shaft 310 (or, opposing ends of rotating shaft 310). Vibrating motor body 100a/180a is secured to housing 312 using a semi-rigid elastomer at the vibration node points of motor body 100a/180a as described for haptic actuator 200 of FIG. 11A, for example. Rotating shaft 310 contacts vibrating motor body 100a or 180a at cylindrical friction surfaces 314 shown in FIG. 15C. Unbalanced masses 302a and 302b are secured to each end of rotating shaft 310 by press fit, adhesive, or other means well known to one of ordinary skill in the art. In this example, integrated driver IC 204 is connected to DC voltage source 206 and I²C serial control interface 208 as described above for haptic actuator 200 of FIG. 11A.

Vibrating motor body 100a or 180a are used for haptic actuator 300 at least because the reaction forces (Fr) 320 acting at points 314 of FIG. 15C are at respective ends of the vibrating motor body 100a or 180a and also on the same side of the rotating shaft 310 and in substantially the same direction. For this example, the symmetry of the haptic actuator 300's construction results in respective centripetal forces ($F_c$) 318 generated by the unbalanced masses 302a and 302b being equal and aligned so that the reaction forces 320 are equal in magnitude and opposite in direction to the centripetal forces 318. Unlike haptic actuator 200 shown in FIG. 11A, in the exemplary embodiment shown in FIGS. 15A-15C, there is no multiplication or amplification of centripetal forces 318 ($F_c$). Haptic actuator 300 has substantially same advantages as haptic actuator 200 in that all the friction generated by the reaction forces 320 is beneficial and used by vibrating motor body 100a/180a to generate torque at both contact points 314. A further exemplary advantage of haptic actuator 300 is a greater strength when the haptic actuator 300 is subjected to external shock at least partly because unbalanced masses 302a and 302b more evenly distribute the bending stress acting on rotating shaft 310.

Referring to FIG. 16A through 16D, haptic actuator 400 is an alternative embodiment that is the same as haptic actuator 200 except a single unbalanced mass 402 is fixed to rotating shaft 410 inside vibrating motor body 100a/180a. Haptic actuator 400 has a housing 412 with integrated vibrating motor body 100a/180a (e.g., an ultrasonic motor or an ultrasonic rotary motor) and integrated driver IC 204. Vibrating motor body 100a/180a is secured to a housing 412 using a semi-rigid elastomer at the vibration node points of motor body 100a/180a as described for haptic actuator 200, although other techniques for securing may be used. Rotating shaft 410 contacts vibrating motor body 100a/180a at contact points 414 of the cylindrical friction surfaces formed by respective cylindrical bushings 106a and 106b. Unbalanced mass 402 is secured to the center of shaft 410 by press fit, adhesive, or other means for securing well known to one of ordinary skill in the art may be used. In this example, integrated driver IC 204 is connected to DC voltage source 206 and I²C serial control interface 208 as described for haptic actuator 200 in FIG. 11A, for example.

Vibrating motor body 100a or 180a are used for haptic actuator 400 because the reaction forces 420 acting at contact points 414 are at the ends of the vibrating motor body 100a/180a and also on substantially the same side of the rotating shaft 410 and in substantially the same direction. For this example, the symmetry of the construction of haptic actuator 400 results in centripetal forces 418 generated by the unbalanced mass 402 being equal in magnitude to the sum of reaction forces 420 but in opposite direction to the centripetal forces 318 and/or reaction force 420. Unlike haptic actuator 200, there is no multiplication or amplification of centripetal force 418 ($F_c$). Haptic actuator 400 has substantially the same exemplary advantages as haptic actuator 200 in that all the friction generated by the reaction forces Fr (elements 420) is beneficial and used by motor body 100a/180a to generate torque at both contact points 414. A further exemplary advantage of haptic actuator 400, when compared to haptic actuators 200 and 300, is even greater strength when the haptic actuator 400 is subjected to external shock because unbalanced mass 402 is evenly distributed between contact points 414 which creates even lower bending stress acting on shaft 410. It is to be noted that although haptic actuator 400 shows only one unbalanced mass 302, a plurality of unbalanced masses distributed along rotating shaft 410 may be used. Further, although vibrating motor body 100a/180a is described in FIGS. 16A-16D, one of ordinary skill in the art can modify haptic actuator 400 to be used with other vibrating motor bodies, for example, vibrating motor body 100.

Figure 17:
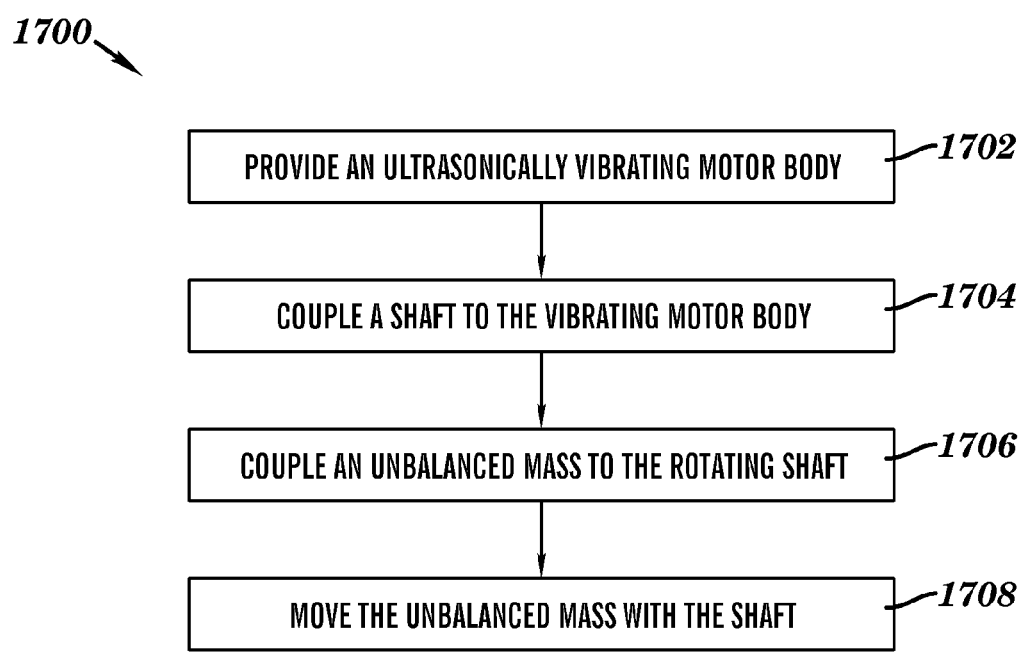
FIG. 17 shows an exemplary method of making the haptic actuator.

Referring to FIG. 17, operation of the haptic actuator with respect to a method of making haptic actuators 200, 200a, 300 will be described using flowchart 1700 with reference back to FIGS. 1A-16D.

In step 1702, an ultrasonically vibrating motor body, for example, vibrating motor body 100 is provided. In one example, in step 1702, providing the ultrasonic vibrating motor body further includes providing a tubular body (e.g., of tube 104) configured to ultrasonically vibrate at a first bending mode (e.g., bending mode 130) in each of two orthogonal planes parallel to an axis of the ultrasonically vibrating motor body, and wherein the rotating shaft 210 further causes the unbalanced mass to rotate and generate a centripetal force $F_c$ which generates the human detectable vibrations. In another example, in step 1702, the tubular body is coupled to at least one piezoelectric plate (e.g., piezoelectric ceramic plate 110) at an outside surface of the tubular body and a plane of the piezoelectric plate is parallel to the axis 105 of the tubular body, the piezoelectric plate configured to bend the tubular body by creating ultrasonic vibrations at resonant bending modes (e.g., bending modes 130 and 135) in two orthogonal planes parallel to the axis 105 of the tubular body of tube 104 when electrically energized, the ultrasonic vibrations causing the shaft 210 to rotate in the at least one direction.

In one example, as discussed above, the ultrasonic vibrations occur at an average frequency of each of the resonant bending modes 130 and 135, for example, that have a substantially 90 degree phase shift and a substantially same amplitude dependent upon a cross-section shape of the tubular body shown, for example, in FIG. 1C.

In one example, the method includes in step 1702, providing the tubular body coupled to at least two piezoelectric plates on an outside surface of the tubular body and respective planes of the plates are parallel to the axis of the tubular body. The at least two piezoelectric plates 110a and 110b are electrically energized by two respective driving waveforms (e.g., waveform shown in FIG. 9) to induce vibrations in the tubular body at an average frequency of first and second orthogonal bending modes 192 and 194 in two respective orthogonal planes and having a substantially the same amplitude and 90 degree phase shift dependent upon a cross-section shape of the tubular body (e.g., cross-section shape shown in FIG. 8C).

Figure 8E:
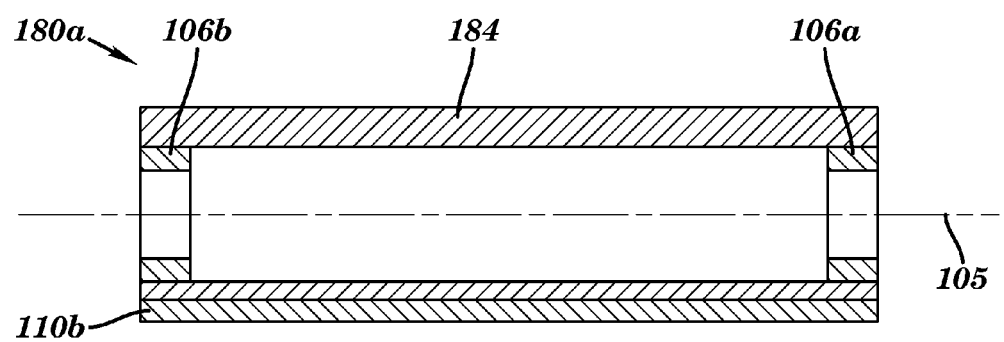
FIG. 8E is a cross section view of tubular motor body of the haptic actuator.

In step 1704, a shaft (e.g., rotating shaft 310) is coupled to the vibrating motor body 100, the shaft arranged to rotate in at least one direction (e.g., a clockwise or an anti-clockwise direction) in response to the vibrating motor body. In one example, in step 1704, the method described by flowchart 1700 includes connecting the tubular body frictionally to the shaft at two cylindrical bushings (e.g., cylindrical bushings 106a and 106b) on an inside diameter of an inside surface of the ultrasonically vibrating motor body 180a. A first one of the two cylindrical bushings is located substantially at one end of the tubular body and a second one of the two cylindrical bushings is located substantially at a middle portion of the tubular body as shown, for example, in FIG. 8B. Alternatively, the method may include coupling the two cylindrical bushings 106a' and 106b' located at each corresponding end of the tubular body as shown in FIG. 8E.

In step 1706, at least one unbalanced mass (e.g., unbalanced mass 202) is coupled to the rotating shaft. In step 1708, the unbalanced mass is moved with the shaft to generate human-detectable vibrations in response to a motion of the shaft. In another example, in step 1706, the method includes coupling at least one unbalanced mass (e.g., unbalanced mass 202) as a single piece of mass fixed to one end of the shaft 210. Alternatively, the method may include the at least one unbalanced mass in the form of two masses (e.g., unbalanced masses 302a and 302b) fixed respectively to opposing ends of the shaft 310. Further, in yet another exemplary embodiment, the method described by flowchart 1700 may include coupling the at least one unbalanced mass (e.g., unbalanced mass 402) as a single piece of mass fixed to the shaft 410 inside a tubular body of the ultrasonically vibrating motor body, between two cylindrical bushings located at each end of the tubular body.

In one example, the method described by flowchart 1700 further includes in step 1706 providing a spring 218 with a low friction contact surface coupled to the shaft 219 and configured to apply a radial force to the shaft 219 to increase friction at one or more contact points between the ultrasonically vibrating motor body 200a and the shaft 219 and for increasing a motor torque associated with the ultrasonically vibrating motor body at a zero speed of the shaft.

In step 1708, an unbalanced mass (e.g., unbalanced mass 402) is moved with the rotating shaft to created human-detectable vibrations in response to a rotation of the shaft. In one exemplary embodiment, the method described by flowchart 1700 further includes providing integrated drive circuit 204 inside housing 412 of the ultrasonically vibrating motor body configured to provide one or more signals for energizing the ultrasonically vibrating motor body. For example, the integrated drive circuit 204 comprises one or more full bridge drive circuits 120a and 120b shown in FIG. 9 and digital control logic.

Although the steps of the flowchart 1700 have been described substantially using the example of haptic actuator 200, steps in flowchart 1700 are equally applicable to haptic actuator 200a or 300, or other haptic actuator systems and modules disclosed herein. Further, steps in flowchart 1700 can be performed in any other order suitable to carry out the exemplary aspects and the order of steps shown in flowchart 1700 is for example only and is not limiting.

Various exemplary embodiments of this technology offer many advantages. For example, the ultrasonic vibration motor achieves unidirectional shaft rotation, higher efficiency and rotational speed than conventional motors while at the same time being less expensive and less complicated to manufacture. Additionally exemplary embodiments of this ultrasonic motor uses a standing-wave tube design with cylindrical bushing contacts where the centripetal force generated by the unbalanced mass generates the friction force at the bushing contacts. Contact between the vibrating tube and rotating shaft to increase efficiency, and a single phase electronic circuit to produces the standing wave vibration that produces shaft rotation.

Having thus described the basic concept of the invention, it will be rather apparent to those of ordinary skill in the art that the foregoing detailed disclosure is intended to be presented by way of example only, and is not limiting. Various alterations, improvements, and modifications will occur and are intended to those of ordinary skill in the art, though not expressly stated herein. These alterations, improvements, and modifications are intended to be suggested hereby, and are within the spirit and scope of the invention. For example, based upon various design and electro-mechanical parameters, unbalanced masses 302a and 302b, spring 218, and cylindrical bushings 106a and 106b may be located at other positions in various embodiments of the haptic actuators described above. Two or more components of the haptic actuators 200, 200a, and/or 300 can be integrated, or may be made parts of an integrated circuit chip. Further, alterations in electrical and mechanical components may be realized by interchanging and/or adding electrical connections and components for mechanical connections or components and vice-versa, as and when appropriate without departing from the scope of various exemplary aspects of this invention as described above. Additionally, the recited order of processing elements or sequences, or the use of numbers, letters, or other designations therefore, is not intended to limit the claimed processes to any order except as may be specified in the claims. Accordingly, the invention may be limited only by the following claims and equivalents thereto.

What is claimed is:

1. A haptic actuator system, comprising:
an ultrasonically vibrating motor body;
a shaft coupled to the vibrating motor body, the shaft arranged to rotate in at least one direction in response to the vibrating motor body; and
at least one unbalanced mass coupled to and moveable with the shaft to generate human-detectable vibrations in response to a motion of the shaft, wherein the ultrasonically vibrating motor body comprises a tubular body frictionally connected to the shaft at two cylindrical bushings on an inside diameter of an inside surface of the ultrasonically vibrating motor body and further wherein a first one of the two cylindrical bushings is located substantially at one end of the tubular body and a second one of the two cylindrical bushings is located substantially at a middle portion of the tubular body.

2. The haptic actuator system as set forth in claim 1, wherein the tubular body is configured to ultrasonically vibrate at a first bending mode in each of two orthogonal planes parallel to an axis of the ultrasonically vibrating motor body, and wherein the rotating shaft further causes the unbalanced mass to rotate and generate a centripetal force which generates the human detectable vibrations.

3. The haptic actuator system as set forth in claim 2, wherein the tubular body is coupled to at least one piezoelectric plate at an outside surface of the tubular body and a plane of the at least one piezoelectric plate is parallel to the axis of the vibrating motor body, the at least one piezoelectric plate configured to bend the tubular body by creating ultrasonic vibrations at resonant bending modes in two orthogonal planes parallel to the axis of the vibrating motor body when electrically energized, the ultrasonic vibrations causing the shaft to rotate in the at least one direction.

4. The haptic actuator system as set forth in claim 3, wherein the ultrasonic vibrations occur at an average frequency of each of the resonant bending modes that have a substantially 90 degree phase shift and a substantially same amplitude dependent upon a cross-section shape of the tubular body.

5. The haptic actuator system as set forth in claim 2, wherein the tubular body is coupled to at least two piezoelectric plates on an outside surface of the tubular body and respective planes of the at least two piezoelectric plates are parallel to the axis of the vibrating motor body.

6. The haptic actuator as set forth in claim 5, wherein the at least two piezoelectric plates are electrically energized by two respective driving waveforms to induce vibrations in the tubular body at an average frequency of a first and a second orthogonal bending mode in two respective orthogonal planes and having substantially the same amplitude and 90 degree phase shift dependent upon a cross-section shape of the tubular body, the induced vibrations cause the shaft to rotate in the at least one direction.

7. The haptic actuator system as set forth in claim 1, wherein the two cylindrical bushings are located at each corresponding end of the tubular body.

8. The haptic actuator system as set forth in claim 1, wherein the at least one unbalanced mass is a single piece of mass fixed to one end of the shaft.

9. The haptic actuator system as set forth in claim 1, wherein the at least one unbalanced mass includes two masses fixed respectively to opposing ends of the shaft.

10. The haptic actuator system as set forth in claim 1, wherein the at least one unbalanced mass is a single piece of mass fixed to the shaft inside a tubular body of the ultrasonically vibrating motor body, between two cylindrical bushings located at each end of the tubular body.

11. The haptic actuator system as set forth in claim 1 further comprising an integrated drive circuit inside a housing of the ultrasonically vibrating motor body configured to provide one or more signals for energizing the ultrasonically vibrating motor body.

12. A haptic actuator system, comprising:
an ultrasonically vibrating motor body;
a shaft coupled to the vibrating motor body, the shaft arranged to rotate in at least one direction in response to the vibrating motor body;
at least one unbalanced mass coupled to and moveable with the shaft to generate human-detectable vibrations in response to a motion of the shaft; and
a spring with a low friction contact surface coupled to the shaft and configured to apply a radial force to the shaft to increase friction at one or more contact points between the ultrasonically vibrating motor body and the shaft and for increasing a motor torque associated with the ultrasonically vibrating motor body at a substantially zero speed of the shaft.

13. The haptic actuator system as set forth in claim 12, wherein the ultrasonically vibrating motor body further comprises a tubular body configured to ultrasonically vibrate at a first bending mode in each of two orthogonal planes parallel to an axis of the ultrasonically vibrating motor body, and wherein the rotating shaft further causes the unbalanced mass to rotate and generate a centripetal force which generates the human detectable vibrations.

14. The haptic actuator system as set forth in claim 13, wherein the tubular body is coupled to at least one piezoelectric plate at an outside surface of the tubular body and a plane of the at least one piezoelectric plate is parallel to the axis of the vibrating motor body, the at least one piezoelectric plate configured to bend the tubular body by creating ultrasonic vibrations at resonant bending modes in two orthogonal planes parallel to the axis of the vibrating motor body when electrically energized, the ultrasonic vibrations causing the shaft to rotate in the at least one direction.

15. The haptic actuator system as set forth in claim 14, wherein the ultrasonic vibrations occur at an average frequency of each of the resonant bending modes that have a substantially 90 degree phase shift and a substantially same amplitude dependent upon a cross-section shape of the tubular body.

16. The haptic actuator system as set forth in claim 13, wherein the tubular body is coupled to at least two piezoelectric plates on an outside surface of the tubular body and respective planes of the at least two piezoelectric plates are parallel to the axis of the vibrating motor body.

17. The haptic actuator as set forth in claim 16, wherein the at least two piezoelectric plates are electrically energized by two respective driving waveforms to induce vibrations in the tubular body at an average frequency of a first and a second orthogonal bending mode in two respective orthogonal planes and having substantially the same amplitude and 90 degree phase shift dependent upon a cross-section shape of the tubular body, the induced vibrations cause the shaft to rotate in the at least one direction.

18. The haptic actuator system as set forth in claim 13, wherein the ultrasonically vibrating motor body comprises a tubular body frictionally connected to the shaft at two cylindrical bushings on an inside diameter of an inside surface of the ultrasonically vibrating motor body and further wherein a first one of the two cylindrical bushings is located substantially at one end of the tubular body and a second one of the two cylindrical bushings is located substantially at a middle portion of the tubular body.

19. The haptic actuator system as set forth in claim 12, wherein the two cylindrical bushings are located at each corresponding end of the tubular body.

20. The haptic actuator system as set forth in claim 12, wherein the at least one unbalanced mass is a single piece of mass fixed to one end of the shaft.

21. The haptic actuator system as set forth in claim 12, wherein the at least one unbalanced mass includes two masses fixed respectively to opposing ends of the shaft.

22. The haptic actuator system as set forth in claim 12, wherein the at least one unbalanced mass is a single piece of mass fixed to the shaft inside a tubular body of the ultrasonically vibrating motor body, between two cylindrical bushings located at each end of the tubular body.

23. The haptic actuator system as set forth in claim 12 further comprising an integrated drive circuit inside a housing of the ultrasonically vibrating motor body configured to provide one or more signals for energizing the ultrasonically vibrating motor body.

24. A method of making a haptic actuator system, comprising:
providing an ultrasonically vibrating motor body;
coupling a shaft to the vibrating motor body, the shaft arranged to rotate in at least one direction in response to the vibrating motor body; and
coupling at least one unbalanced mass to the shaft and moving the unbalanced mass with the shaft to generate human-detectable vibrations in response to a motion of the shaft, wherein the ultrasonically vibrating motor body comprises a tubular body frictionally connected to the shaft at two cylindrical bushings on an inside diameter of an inside surface of the ultrasonically vibrating motor body and further, wherein a first one of the two cylindrical bushings is located substantially at one end of the tubular body and a second one of the two cylindrical bushings is located substantially at a middle portion of the tubular body.

25. The method as set forth in claim 24, wherein the tubular body is configured to ultrasonically vibrate at a first bending mode in each of two orthogonal planes parallel to an axis of the ultrasonically vibrating motor body, and wherein the rotating shaft further causes the unbalanced mass to rotate and generate a centripetal force which generates the human detectable vibrations.

26. The method as set forth in claim 25, wherein the tubular body is coupled to at least one piezoelectric plate at an outside surface of the tubular body and a plane of the at least one piezoelectric plate is parallel to the axis of the vibrating motor body, the at least one piezoelectric plate configured to bend the vibrating motor body by creating ultrasonic vibrations at resonant bending modes in two orthogonal planes parallel to the axis of the tubular body when electrically energized, the ultrasonic vibrations causing the shaft to rotate in the at least one direction.

27. The method as set forth in claim 26, wherein the ultrasonic vibrations occur at an average frequency of each of the resonant bending modes that have a substantially 90 degree phase shift and a substantially same amplitude dependent upon a cross-section shape of the tubular body.

28. The method as set forth in claim 25, wherein the tubular body is coupled to at least two piezoelectric plates on an outside surface of the tubular body and respective planes of the at least two piezoelectric plates are parallel to the axis of the vibrating motor body.

29. The method as set forth in claim 28, wherein the at least two piezoelectric plates are electrically energized by two respective driving waveforms to induce vibrations in the tubular body at an average frequency of a first and a second orthogonal bending mode in two respective orthogonal planes and having substantially the same amplitude and 90 degree phase shift dependent upon a cross-section shape of the tubular body, the induced vibrations cause the shaft to rotate in the at least one direction.

30. The method as set forth in claim 24, wherein the two cylindrical bushings are located at each corresponding end of the tubular body.

31. The method as set forth in claim 24, wherein the at least one unbalanced mass is a single piece of mass fixed to one end of the shaft.

32. The method as set forth in claim 24, wherein the at least one unbalanced mass includes two masses fixed respectively to opposing ends of the shaft.

33. The method as set forth in claim 24, wherein the at least one unbalanced mass is a single piece of mass fixed to the shaft inside a tubular body of the ultrasonically vibrating motor body, between two cylindrical bushings located at each end of the tubular body.

34. A method of making a haptic actuator system, comprising:
providing an ultrasonically vibrating motor body;
coupling a shaft to the vibrating motor body, the shaft arranged to rotate in at least one direction in response to the vibrating motor body; and
coupling at least one unbalanced mass to the shaft and moving the unbalanced mass with the shaft to generate human-detectable vibrations in response to a motion of the shaft; and
providing a spring with a low friction contact surface coupled to the shaft and configured to apply a radial force to the shaft to increase friction at one or more contact points between the ultrasonically vibrating motor body and the shaft and for increasing a motor torque associated with the ultrasonically vibrating motor body at a substantially zero speed of the shaft.

35. The method as set forth in claim 24 further comprising:
providing an integrated drive circuit inside a housing of the ultrasonically vibrating motor body configured to provide one or more signals for energizing the ultrasonically vibrating motor body.

36. The method as set forth in claim 34, wherein the ultrasonically vibrating motor body further comprises a tubular body configured to ultrasonically vibrate at a first bending mode in each of two orthogonal planes parallel to an axis of the ultrasonically vibrating motor body, and wherein the rotating shaft further causes the unbalanced mass to rotate and generate a centripetal force which generates the human detectable vibrations.

37. The method as set forth in claim 36, wherein the tubular body is coupled to at least one piezoelectric plate at an outside surface of the tubular body and a plane of the at least one piezoelectric plate is parallel to the axis of the vibrating motor body, the at least one piezoelectric plate configured to bend the vibrating motor body by creating ultrasonic vibrations at resonant bending modes in two orthogonal planes parallel to the axis of the tubular body when electrically energized, the ultrasonic vibrations causing the shaft to rotate in the at least one direction.

38. The method as set forth in claim 37, wherein the ultrasonic vibrations occur at an average frequency of each of the resonant bending modes that have a substantially 90 degree phase shift and a substantially same amplitude dependent upon a cross-section shape of the tubular body.

39. The method as set forth in claim 36, wherein the tubular body is coupled to at least two piezoelectric plates on an outside surface of the tubular body and respective planes of the at least two piezoelectric plates are parallel to the axis of the vibrating motor body.

40. The method as set forth in claim 39, wherein the at least two piezoelectric plates are electrically energized by two respective driving waveforms to induce vibrations in the tubular body at an average frequency of a first and a second orthogonal bending mode in two respective orthogonal planes and having substantially the same amplitude and 90 degree phase shift dependent upon a cross-section shape of the tubular body, the induced vibrations cause the shaft to rotate in the at least one direction.

41. The method as set forth in claim 34, wherein the ultrasonically vibrating motor body comprises a tubular body frictionally connected to the shaft at two cylindrical bushings on an inside diameter of an inside surface of the ultrasonically vibrating motor body and further, wherein a first one of the two cylindrical bushings is located substantially at one end of the tubular body and a second one of the two cylindrical bushings is located substantially at a middle portion of the tubular body.

42. The method as set forth in claim 34, wherein the two cylindrical bushings are located at each corresponding end of the tubular body.

43. The method as set forth in claim 34, wherein the at least one unbalanced mass is a single piece of mass fixed to one end of the shaft.

44. The method as set forth in claim 34, wherein the at least one unbalanced mass includes two masses fixed respectively to opposing ends of the shaft.

45. The method as set forth in claim 34, wherein the at least one unbalanced mass is a single piece of mass fixed to the shaft inside a tubular body of the ultrasonically vibrating motor body, between two cylindrical bushings located at each end of the tubular body.

46. The method as set forth in claim 34 further comprising:
providing an integrated drive circuit inside a housing of the ultrasonically vibrating motor body configured to provide one or more signals for energizing the ultrasonically vibrating motor body.

* * * * *